United States Patent
Oiwa et al.

(10) Patent No.: US 9,450,469 B2
(45) Date of Patent: Sep. 20, 2016

(54) INCHWORM ACTUATOR

(75) Inventors: Takaaki Oiwa, Hamamatsu (JP); Junichi Asama, Hamamatsu (JP)

(73) Assignee: National University Corporation Shizuoka University, Shizuoka-shi (JP)

( * ) Notice: Subject to any disclaimer, the term of this patent is extended or adjusted under 35 U.S.C. 154(b) by 733 days.

(21) Appl. No.: 13/261,618

(22) PCT Filed: Sep. 22, 2011

(86) PCT No.: PCT/JP2011/071560
§ 371 (c)(1),
(2), (4) Date: Sep. 2, 2013

(87) PCT Pub. No.: WO2012/039449
PCT Pub. Date: Mar. 29, 2012

(65) Prior Publication Data
US 2013/0334902 A1 Dec. 19, 2013

(30) Foreign Application Priority Data
Sep. 24, 2010 (JP) .................................. 2010-214580

(51) Int. Cl.
*H02K 33/12* (2006.01)
*H02K 7/00* (2006.01)
*H02K 33/18* (2006.01)
*H02K 99/00* (2014.01)

(52) U.S. Cl.
CPC ................ *H02K 7/00* (2013.01); *H02K 33/12* (2013.01); *H02K 33/18* (2013.01); *H02K 57/006* (2013.01)

(58) Field of Classification Search
USPC ........ 310/15, 20, 36, 40 MM, 328, 366, 369
See application file for complete search history.

(56) References Cited

U.S. PATENT DOCUMENTS

| 5,332,942 A | * | 7/1994 | Rennex | .................. H02N 2/023 310/328 |
| 5,736,797 A | * | 4/1998 | Motohashi | ............. H02K 33/16 310/36 |

(Continued)

FOREIGN PATENT DOCUMENTS

| JP | 08033386 | 2/1996 |
| JP | 2000269579 | 9/2000 |
| JP | 2005175271 | 6/2005 |

(Continued)

*Primary Examiner* — Tran Nguyen
(74) *Attorney, Agent, or Firm* — Michael Tobias

(57) ABSTRACT

An inchworm actuator which can move a movable body relative to a stationary body while selectively giving priority to displacement speed or displacement resolution in accordance with the conditions of use is provided. An inchworm actuator 100 includes a movable body 110 supported between first and second guides 101 and 102 which are made of a magnetic material and which extend parallel to each other. In the movable body 110, a voice coil motor 115 is supported by first and second support legs 111 and 112 through toggle mechanisms 116*a* and 116*b*. The first and second support legs 111 and 112 are made of a magnetic material and have magnetic field-forming coils 113 and 114. The toggle mechanisms 116*a* and 116*b* convert the amount of displacement input from the voice coil motor 115 using a reducing conversion ratio corresponding to the amount of the displacement and transmit a resultant displacement to the first and second support legs 111 and 112. The first and second guides 101 and 102 are connected together by upper and lower frames 103 and 104 which are made of a magnetic material and which have permanent magnets 105*a* and 105*b*.

19 Claims, 12 Drawing Sheets

(56) References Cited

U.S. PATENT DOCUMENTS 5,834,864 A * 11/1998 Hesterman ............ G01Q 10/04
310/40 MM
2008/0079520 A1* 4/2008 Vranish .................... H01F 7/08
335/207

FOREIGN PATENT DOCUMENTS

| JP | 2006288165 | 10/2006 |
| JP | 2007318861 | 12/2007 |
| JP | 2008126396 | 6/2008 |

* cited by examiner

INCHWORM ACTUATOR

TECHNICAL FIELD

The present invention relates to an inchworm actuator which is used as a positioning mechanism in equipment such as precision observation equipment, precision measurement equipment, various types of machining/assembly apparatuses, various types of robots, various types of business machines, and household appliances, or is used for manipulating an object in various operations such as cell operations, microsurgery, sampling under a microscope, and assembly of precision components.

BACKGROUND ART

An inchworm actuator has been known as a compact precise positioning mechanism. For example, Patent Document 1 discloses an inchworm actuator in which a movable body which moves on a guide includes three piezoelectric elements which expand upon receipt of electric energy. In this inchworm actuator, the movable body is moved along the guide by inchworm drive, i.e., by alternately repeating expansion and contraction operations of a feed piezoelectric element and clamping and unclamping operations of the two anchoring piezoelectric elements.

However, the above-described inchworm actuator has the problem that since the feed piezoelectric element is unclamped when no electricity is supplied to the two anchoring piezoelectric elements, the position of the movable body on the guide cannot be maintained. Therefore, the conventional inchworm actuator is inconvenient for use as a positioning mechanism. In view of this drawback, below-listed Patent Documents 2 and 3, for example, disclose inchworm actuators which can maintain the position of a movable body without the need for electric power.

Specifically, below-listed Patent Document 2 discloses an inchworm actuator which includes a link mechanism which brings clamp blocks into a clamping state so as to fix the position of a movable body when an anchoring piezoelectric element for the movable body contracts (i.e., when no electricity is supplied to the anchoring piezoelectric element). Below-listed Patent Document 3 discloses an inchworm actuator which includes a permanent magnet provided on a movable body and a magnetic attracting member provided on a base along which the movable body moves. The movable body is magnetically attracted and fixed to the base whereby the position of the movable body is maintained.

PRIOR ART DOCUMENTS

Patent Documents

Patent Document 1: Japanese Patent Application Laid-Open (kokai) No. 2006-288165
Patent Document 2: Japanese Patent Application Laid-Open (kokai) No. 2005-175271
Patent Document 3: Japanese Patent Application Laid-Open (kokai) No. 2000-269579

However, the inchworm actuators disclosed in Patent Documents 1 to 3 have the problem that since the ratio of the displacement of a movable body to the voltage which is input to a piezoelectric element or electromagnet in order to move the movable body is constant or fixed, namely, since the resolution of displacement of the movable body (referred to below as "displacement resolution") is fixed, it is difficult to selectively give priority to the speed of displacement of the movable body (referred to below as "displacement speed") or the displacement resolution in accordance with the conditions of use. For example, when the displacement resolution of the movable body of the inchworm actuator is increased, increasing the displacement speed of the movable body becomes difficult because the amount of displacement each time inchworm drive is carried out is small. Although the displacement speed of the movable body can be increased by increasing the amount of displacement each time inchworm drive is carried out, doing so decreases the displacement resolution. Therefore, the conventional inchworm actuators are inconvenient to use because they cannot move the movable body while selectively giving priority to the displacement speed or the displacement resolution in accordance with the conditions of use.

SUMMARY OF THE INVENTION

The present invention was accomplished in order to solve the above-described problem, and its object is to provide an inchworm actuator which can move a movable body relative to a stationary body while selectively giving priority to the displacement speed or the displacement resolution in accordance with the conditions of use.

In order to achieve the above-described object, according to one feature, the present invention provides an inchworm actuator in which a movable body moves relative to a stationary body as a result of inchworm drive, comprising first and second support legs which form a portion of the movable body and which move relative to the stationary body while being repeatedly clamped to the stationary body and unclamped therefrom; expansion/contraction means which forms a portion of the movable body and which displaces or deforms upon receipt of electric energy or magnetic energy; a displacement conversion mechanism which forms a portion of the movable body and which receives as an input displacement the displacement or deformation of the expansion/contraction means, coverts it to an output displacement in accordance with a conversion ratio by amplifying conversion (conversion performed such that the amount of the output displacement becomes greater than the amount of the input displacement) or reducing conversion (conversion performed such that the amount of the output displacement becomes smaller than the amount of the input displacement), and moves the first and second support legs relative to each other by the output displacement, the conversion ratio changing in accordance with the amount of the input displacement; clamp means for individually clamping the first and second support legs to the stationary body and individually unclamping the first and second support legs therefrom; and inchworm control means for driving the expansion/contraction means and the clamp means so as to realize an inchworm action to thereby move the movable body relative to the stationary body.

According to this feature of the present invention, the inchworm actuator is configured such that the first and second support legs of the movable body are moved relative to each other by the displacement conversion mechanism. The displacement conversion mechanism receives the displacement or deformation of the expansion/contraction means as an input displacement, converts it to an output displacement by amplifying conversion or reducing conversion in accordance with a conversion ratio, and moves the first and second support legs relative to each other by the output displacement, wherein the conversion ratio changes in accordance with the amount of the input displacement.

Namely, the displacement conversion mechanism can change the conversion ratio for amplifying conversion or reducing conversion of the input displacement. As a result, the inchworm actuator can freely set the displacement speed and/or displacement resolution of the movable body by selectively using an amplifying conversion ratio or a reducing conversion ratio within the range of the amplifying conversion ratio or reducing conversion ratio of the displacement conversion mechanism. As long as the output displacement changes in accordance with the input displacement, the manner in which the conversion ratio changes is not restricted, and it may change either linearly or non-linearly.

According to another feature of the present invention, the displacement conversion mechanism being is a link mechanism. According to this feature of the present invention, the displacement conversion mechanism of the inchworm actuator can be configured using a simple structure. Therefore, it is possible to freely set the displacement speed and displacement resolution of the movable body and the propelling force for displacement in accordance with the conditions of use while suppressing increases in the degree of complexity, size, and weight of the movable body.

According to yet another feature of the present invention, the displacement conversion mechanism is a toggle mechanism. According to this feature, the displacement conversion mechanism of the inchworm actuator can be configured using a simple structure. Therefore, it is possible to freely set the displacement speed and displacement resolution of the movable body and the propelling force for displacement in accordance with the conditions of use while suppressing increases in the degree of complexity, size, and weight of the movable body.

According to a further feature of the present invention, the inchworm control means drives the expansion/contraction means and the clamp means so as to realize an inchworm action in a biased state in which the expansion/contraction means has been displaced or deformed by a prescribed amount.

According to this feature, the expansion/contraction means and the clamp means of the inchworm actuator are driven so as to realize an inchworm action in a state in which the expansion/contraction means has been displaced or deformed by a prescribed amount. Namely, the expansion/contraction means and the clamp means of the inchworm actuator are driven so as to realize an inchworm action in a state in which the displacement conversion mechanism has been deformed by a prescribed amount. This enables the displacement conversion mechanism to perform amplifying conversion or reducing conversion so as to convert the displacement or deformation of the expansion/contraction means while changing the conversion ratio to an arbitrary amplifying conversion ratio or reducing conversion ratio. As a result, the displacement speed and displacement resolution of the movable body and the propelling force for displacement can be easily changed by adjusting the biased state.

According to an additional feature of the present invention, the expansion/contraction means comprises a voice coil motor. According to this feature, the inchworm actuator consumes less electric power and has an increased response speed compared with the case where the expansion/contraction means comprises a piezoelectric element. When the displacement conversion mechanism comprises a toggle mechanism, the displacement speed and displacement resolution of the movable body and the propelling force for displacement can be easily changed by changing the stroke of the voice coil motor.

According to another feature of the present invention, the expansion/contraction means comprising comprises an electromagnet; a first movable piece which is made of a magnetic material and which faces a first pole of the electromagnet with a first clearance formed between the first movable piece and the first pole; a second movable piece which is made of a magnetic material and which faces a second pole of the electromagnet with a second clearance formed between the second movable piece and the second pole, the second clearance being greater than the first clearance; and first and second elastic members which are disposed between the electromagnet and the first movable piece and between the electromagnet and the second movable piece, respectively.

According to this feature, the structure of the expansion/contraction means can be simplified and the mass thereof can be reduced compared with the case where the expansion/contraction means comprises a voice coil motor. Therefore, the inchworm actuator can have an increased response speed. When the displacement conversion mechanism comprises a toggle mechanism, the displacement speed and displacement resolution of the movable body and the propelling force for displacement can be easily changed by selectively using the first clearance and the second clearance.

According to still another feature of the present invention, at least one of the stationary body and a support leg portion including the first support leg and/or the second support leg being made of a magnetic material, and the other of the stationary body and the support leg portion includes a permanent magnet.

According to this feature, the entire movable body of the inchworm actuator is fixed to the stationary body as a result of the first support leg and/or the second support leg being magnetically attracted and fixed to the stationary body by the magnetic force of the permanent magnet. This enables the inchworm actuator to maintain the position of the movable body by a simple structure even when no electricity is supplied to the movable body.

According to yet another feature of the present invention, the stationary body is made of a magnetic material; the first and second support legs are made of a magnetic material and are magnetically connected together through a magnetic conductor made of a magnetic material; the permanent magnet produces magnetic fields of the same direction in the first and second support legs; the clamp means comprises a magnetic field-forming coil provided on at least one of the first support leg, the second support leg, and the magnetic conductor; and the inchworm control means controls operation of the magnetic field-forming coil so as to simultaneously generate magnetic fields of opposite directions in the first and second support legs.

According to this feature, the magnetic field-forming coil produces magnetic fields of opposite directions in the first and second support legs which are magnetically united by the magnetic conductor and in which magnetic fields of the same direction are produced by the permanent magnet. Therefore, one of the first and second support legs is attracted and clamped to the stationary body by a strong magnetic force stemming from the magnetic field produced by the magnetic field-forming coil, and the other support leg is attracted by a relatively weak magnetic force such that the other support leg is unclamped. Namely, the inchworm actuator performs the operation of fixing and releasing the first and second support legs by a simple structure. In the inchworm actuator, when no electricity is supplied to the magnetic field-forming coil, the first and second support legs can be magnetically attracted and fixed to the stationary body by the permanent magnet which produces magnetic fields in the first and second support legs. Namely, the inchworm actuator can maintain the position of the movable body even when no electricity is supplied to the movable body.

According to a further feature of the present invention, the stationary body comprises first and second guides which are made of a magnetic material and which extend parallel to each other; the first and second support legs are made of a magnetic material and are disposed between the first and second guides such that the first and second support legs are magnetically connected together; the permanent magnet produces magnetic fields of the same direction in the first and second support legs; the clamp means comprises a magnetic field-forming coil provided on at least one of the first support leg, the second support leg, the first guide, and the second guide; and the inchworm control means controls operation of the magnetic field-forming coil so as to simultaneously generate magnetic fields of opposite directions in the first and second support legs.

According to this feature, the movable body which comprises the first and second support legs which are made of a magnetic material and have a magnetic field-forming coil, the expansion/contraction means, and the displacement conversion mechanism is disposed between first and second guides made of a magnetic material. Since the movable body of the inchworm actuator moves along the first and second guides, the movable body can be moved accurately and stably. In the inchworm actuator, when no electricity is supplied to the magnetic field-forming coil, the first and second support legs can be magnetically attracted and fixed to the stationary body by the permanent magnet which produces magnetic fields in the first and second support legs. Namely, the inchworm actuator can maintain the position of the movable body even when no electricity is supplied to the movable body, while realizing the operation of clamping and unclamping the first and second support legs. In this case, the structure of the movable body can be simplified and the weight thereof can be reduced by providing the permanent magnet on, for example, the first and second guides. This enables the inchworm actuator to maintain the position of the movable body without increasing the degree of complexity of the structure, size, and weight of the movable body compared to the movable body according to the prior art.

According to an additional feature of the present invention, the permanent magnet is disposed on the outer side of each of the first and second support legs between the first and second guides.

According to this feature, the movable body can be made compact, and the range of displacement of the movable body can be increased. As a result, it is possible to reduce the size of the inchworm actuator and to increase the displacement speed and positioning accuracy of the movable body.

According to another feature of the present invention, the magnetic field-forming coil is disposed on each of the first and second support legs.

According to this feature, magnetic fields can be precisely produced in the first and second support legs. In addition, when the permanent magnet is disposed on the first and second support legs, the magnetic fields produced in the first and second support legs by the permanent magnet can be reliably cancelled. Accordingly, in the inchworm actuator, the first and second support legs can be accurately brought into the unclamped state, whereby the displacement of the movable body can be made smoother and positioning accuracy can be improved.

According to yet another feature of the present invention, the magnetic field-forming coil disposed on the first support leg and the magnetic field-forming coil disposed on the second support leg are connected in series such that they are opposite in phase from each other.

According to this feature, two magnetic field-forming coils (the first magnetic field-forming coil disposed on the first support leg and the second magnetic field-forming coil disposed on the second support leg) can be controlled by a single amplifier, i.e., by a single system. Therefore, the structure of the inchworm actuator can be simplified.

The inchworm actuator may be configured such that the stationary body is made of a magnetic material, the first and second support legs are made of a magnetic material, the clamp means comprises magnetic field-forming coils provided on the first and second support legs, and the inchworm control means controls the operation of the magnetic field-forming coils so as to alternately generate magnetic fields in the first and second support legs.

The inchworm actuator may be configured such that the stationary body is made of a magnetic material, the first and second support legs are made of a magnetic material and have respective permanent magnets, the clamp means comprises magnetic field-forming coils provided on the first and second support legs, and the inchworm control means controls the operation of the magnetic field-forming coils so as to simultaneously generate magnetic fields in the first and second support legs.

MODE FOR CARRYING OUT THE INVENTION

Figure 1:
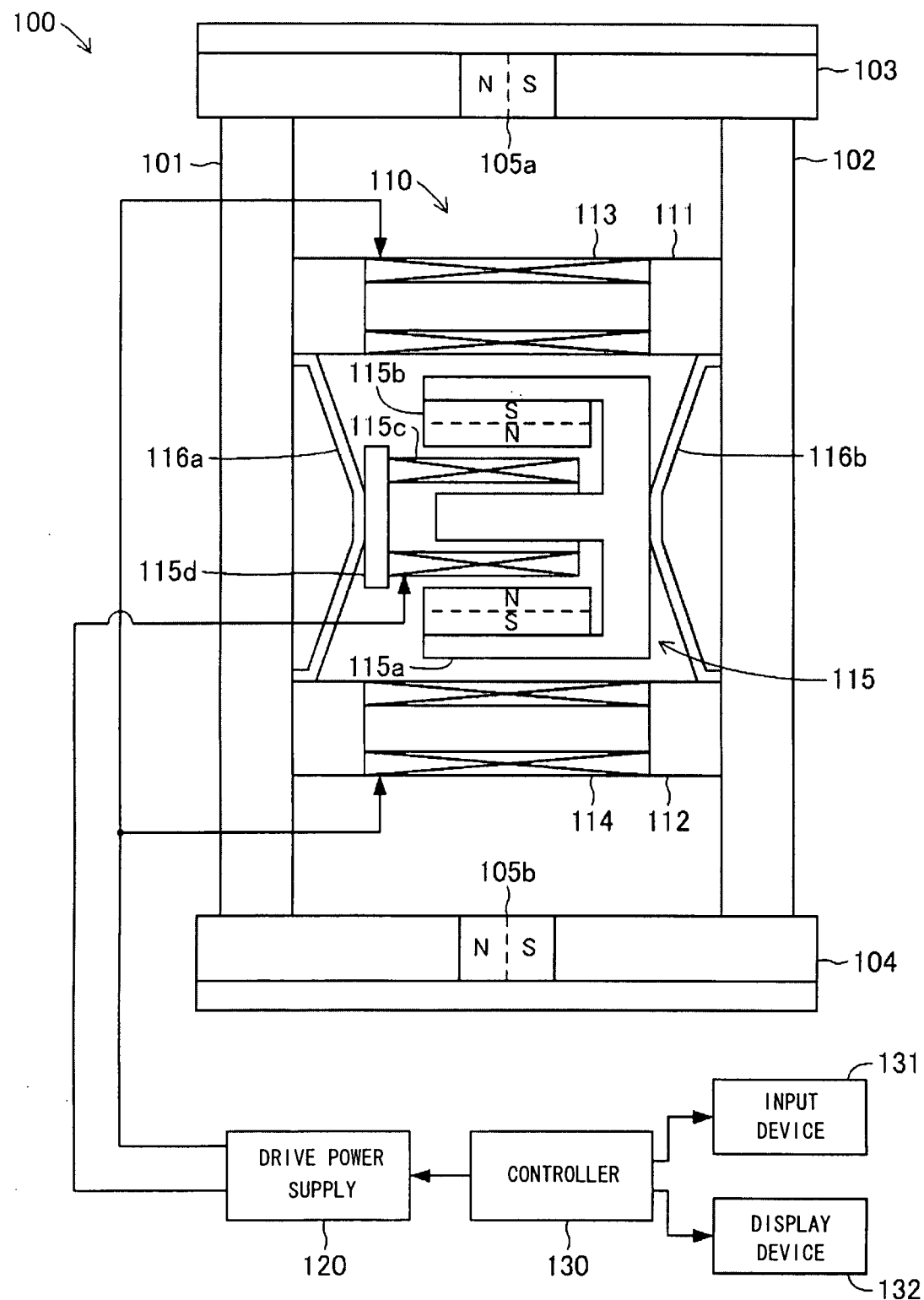
FIG. 1 is a front view schematically showing the overall structure of an inchworm actuator according to one embodiment of the present invention.

Embodiments of an inchworm actuator according to the present invention will now be described with reference to the drawings. FIG. 1 is a front view schematically showing the overall structure of an inchworm actuator 100 according to the present invention. In each of the drawings which will be referred to herein, some components are shown schematically, such as in an exaggerated manner so as to facilitate an understanding of the present invention. Therefore, the dimensions, dimensional ratios, etc. of the constituent elements may differ from the actual dimensions, dimensional ratios, etc. This inchworm actuator 100 is used as a positioning mechanism in equipment such as precision observation equipment, precision measurement equipment, various types of machining/assembly apparatuses, various types of robots, various types of business machines, and household appliances.

(Structure of the Inchworm Actuator 100)

The inchworm actuator 100 includes a single first guide 101 and two second guides 102 which are bar-shaped and extend parallel with one another. The first guide 101 and the second guides 102 are components which cooperate in order to support and guide a below-described movable body 110 for displacement in the axial direction. The first guide 101 and the second guides 102 are disposed in parallel with one another such that they extend vertically. The first guide 101 and the second guides 102 are made of a material which is magnetized in a magnetic field, namely, a magnetic material. In the present embodiment, each of the first guide 101 and the second guides 102 is formed from a round bar made of carbon steel.

Upper and lower ends of the first guide 101 and the second guides 102 are fixedly supported by an upper frame 103 and a lower frame 104, respectively. The upper frame 103 and the lower frame 104 are components which maintain the first guide 101 and the second guides 102 in a parallel state and form a magnetic circuit between the first guide 101 and the second guides 102. More specifically, the upper and lower ends of the first guide 101 and the second guides 102 are connected and fixed to the upper frame 103 and the lower frame 104, respectively, by bolts. Each of the upper frame 103 and the lower frame 104 is formed from a square bar made of carbon steel, which is a magnetic material. Permanent magnets 105a and 105b are embedded in central portions of the upper frame 103 and the lower frame 104.

The permanent magnets 105a and 105b cause the first guide 101 and the second guides 102 to magnetically attract and hold the below-described movable body 110 and generate magnetic fields of the same direction in the below-described first and second support legs 111 and 112. In the present embodiment, the permanent magnets 105a and 105b are neodymium magnets and are fixed within the upper frame 103 and the lower frame 104 such that their N poles are located on the side closer to the first guide 101 (on the left side in FIG. 1). Of course, the permanent magnets 105a and 105b may be another type of magnet such as a ferrite magnet.

Figure 2:
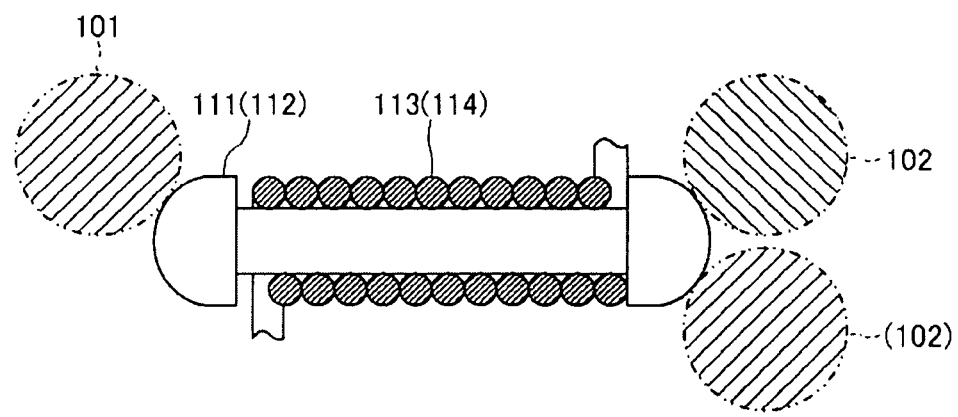
FIG. 2 is a plan view schematically showing the structure of the first and second support legs of the inchworm actuator shown in FIG. 1.

The movable body 110 is disposed in the space between the first guide 101 and the second guides 102. The movable body 110 is a unit which moves in the axial direction of the first guide 101 and the second guides 102 and which includes a first support leg 111 and a second support leg 112. The first support leg 111 and the second support leg 112 move the movable body 110 while in sliding contact with the first guide 101 and the second guides 102. The first support leg 111 and the second support leg 112 are rod-shaped members having a length corresponding to the distance between the first guide 101 and the second guides 102. As shown in FIG. 2, each of the first and second support legs 111 and 112 has semicircular opposite ends as viewed from above such that each support leg 111 (112) is in contact with the peripheral surfaces of the first and second guides 101 and 102 at three points. In FIG. 2, the perimeters of the cross sections of the first and second guides 101 and 102 are indicated by alternate long and two short dashed lines.

Each of the first and second support legs 111 and 112 has a thinner portion between its opposite ends. Magnetic field-forming coils 113 and 114 are wound around the thinner portions of the first and second support legs 111 and 112. The magnetic field-forming coils 113 and 114, which generate magnetic fields of opposite directions in the first and second support legs 111 and 112, are formed by helically winding conductor wires made of copper. These magnetic field-forming coils 113 and 114 are connected in series such that they have opposite phases. A voice coil motor (VCM) 115 is disposed between the first and second support legs 111 and 112 with toggle mechanisms 116a and 116b interposed therebetween.

The voice coil motor 115 is a drive unit for converting electric energy to linear motion. More specifically, the voice coil motor 115 is a mechanism which utilizes the phenomenon that when current is supplied to a coil disposed in a magnetic field, a force is generated in the coil in a direction perpendicular to the direction of the magnetic field and the direction of the current. The voice coil motor 115 primarily comprises a yoke 115a, permanent magnets 115b, and a voice coil 115c.

The yoke 115a is a magnetic component for amplifying a magnetic force produced by magnetic fields generated by the permanent magnets 115b and the voice coil 115c. The yoke 115a is made of soft iron and has a shape like the letter E. The yoke 115a has upper and lower beam portions which extend horizontally from the upper and lower ends of the body of the yoke 115a. The permanent magnets 115b are bonded to the upper and lower beam portions such that the same poles (N poles) face each other. The permanent magnets 115*b*, which generate magnetic fields in the yoke 115*a*, are neodymium magnets. A central portion of toggle mechanism 116*b* is connected to a central portion of the back surface of the yoke 115*a*. Thus, the yoke 115*a* is connected to the right ends (in FIG. 1) of the first and second support legs 111 and 112 through toggle mechanism 116*b*.

Like the magnetic field-forming coils 113 and 114, the voice coil 115*c* is formed by helically winding a copper conductor wire into a tubular shape. The voice coil 115*c* is supported such that it surrounds the peripheral surface of a central beam portion of the yoke 115*a* which extends horizontally and leftward (in FIG. 1) from the central portion of the body of the yoke 115*a* and such that the voice coil 115*c* can move in the axial direction of the central beam portion. More specifically, a central portion of toggle mechanism 116*a* is connected to one end of the voice coil 115*c* with a support plate 115*d* made of a non-magnetic material (e.g., a resin) interposed therebetween. Thus, the voice coil 115*c* is connected to the left ends (in FIG. 1) of the first and second support legs 111 and 112 through toggle mechanism 116*a*.

Figure 3:
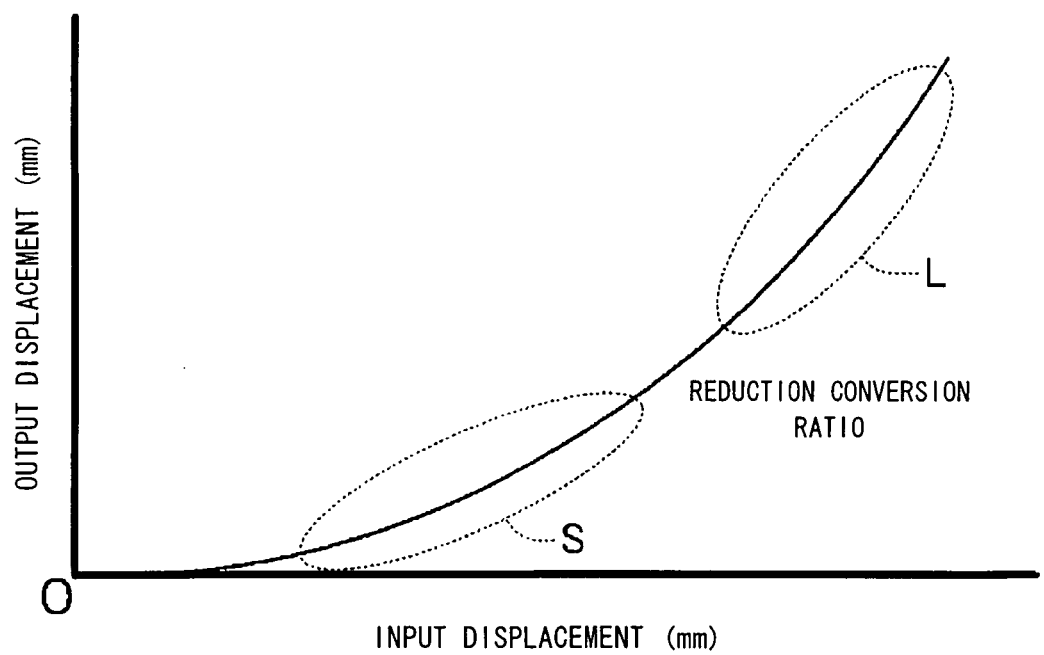
FIG. 3 is a graph showing variation in the conversion ratio (i.e., the ratio of output displacement to input displacement) of the toggle mechanism shown in FIG. 1.

The toggle mechanisms 116*a* and 116*b* are link mechanisms which support the yoke 115*a* and the voice coil 115*c* for relative displacement in the horizontal direction (in FIG. 1) and which convert the relative displacement of the yoke 115*a* and the voice coil 115*c* to relative displacement of the first and second support legs 111 and 112 such that the latter becomes smaller than the former (this conversion will be referred to below as "reducing conversion"). Specifically, as shown in FIG. 3, the toggle mechanisms 116*a* and 116*b* can nonlinearly change the reduction ratio of the output displacement to the input displacement (this reduction ratio will be referred to below as the "reducing conversion ratio"). This means that the toggle mechanisms 116*a* and 116*b* can freely change the reducing conversion ratio. In this case, the reducing conversion ratio of the toggle mechanisms 116*a* and 116*b* changes in accordance with the amount of input displacement. Therefore, within an allowable range set for the input displacement, the toggle mechanisms 116*a* and 116*b* can convert (or reduce) the input displacement in accordance with an arbitrary conversion ratio. The toggle mechanisms 116*a* and 116*b* can generate a propelling force amplified by an amplification factor corresponding to the reducing conversion ratio. Therefore, the toggle mechanisms 116*a* and 116*b* also function as a force boosting mechanism.

Each of the toggle mechanisms 116*a* and 116*b* is formed by bending an elongated leaf spring at a central portion thereof. The yoke 115*a* and the voice coil 115*c* of the voice coil motor 115 are respectively connected to the back surfaces of the bent portions of the toggle mechanisms 116*a* and 116*b*. Upper and lower end portions of the toggle mechanisms 116*a* and 116*b* are fixed to the corresponding end portions of the first and second support legs 111 and 112. When the voice coil 115*c* moves relative to the yoke 115*a*, the toggle mechanisms 116*a* and 116*b* elastically deform such that the angles of the bent portions to which the yoke 115*a* and the voice coil 115*c* are connected increase or decrease. As a result, the upper and lower ends portions of the toggle mechanisms 116*a* and 116*b* move upward and downward in FIG. 1. Namely, the toggle mechanisms 116*a* and 116*b* are link mechanisms which convert the relative displacement of the yoke 115*a* and the voice coil 115*c* into displacements of the upper and lower ends portions of the toggle mechanisms 116*a* and 116*b* in accordance with a reducing conversion ratio. The reducing conversion ratio of the toggle mechanisms 116*a* and 116*b* depends on the angle of the bent portions to which the yoke 115*a* and the voice coil 115*c* are connected.

The relative displacement (in the horizontal direction in FIG. 1) of the yoke 115*a* and the voice coil 115*c* supported by the toggle mechanisms 116*a* and 116*b* refers to a relative displacement of the yoke 115*a* and the voice coil 115*c* such that they attract each other and a relative displacement of the yoke 115*a* and the voice coil 115*c* such that they repel each other due to the Lorentz force which is produced between the yoke 115*a* and the voice coil 115*b* upon energization of the voice coil 115*c*.

Magnetic field-forming coil 113, magnetic field-forming coil 114, and the voice coil 115*c* are connected to a controller 130 through a drive power supply 120. The drive power supply 120 is controlled by the controller 130 so as to supply electric power to magnetic field-forming coil 113, magnetic field-forming coil 114, and the voice coil 115*c* to thereby drive them. In the present embodiment, a voltage of about 24 V is applied to magnetic field-forming coil 113, magnetic field-forming coil 114, and the voice coil 115*c*. The electrical energy supplied to magnetic field-forming coil 113, magnetic field-forming coil 114, and the voice coil 115*c* is properly selected in accordance with the specifications of the inchworm actuator and is not limited to that employed in the present embodiment.

The controller 130 comprises a microcomputer which includes a CPU, ROM, RAM, etc. In accordance with instructions from an input device 131, the controller 130 executes an unillustrated control program so as to control operations of magnetic field-forming coil 113, magnetic field-forming coil 114, and the voice coil 115*c*. The input device 131, which is an interface through which a user of the inchworm actuator 100 provides instructions to the controller 130, includes a plurality of mechanical key switches. A display device 132 which comprises a liquid-crystal display is connected to the controller 130. The display device 132 is used to display the operation status of the controller 130 and the inchworm actuator 100. In the present embodiment, the controller 130 is a personal computer. However, the controller 130 is not limited to such a computer employed in the present embodiment so long as the controller 130 can execute the various above-described functions.

(Operation of the Inchworm Actuator 100)

Next, operation of the inchworm actuator 100 having the above-described structure will be described. First, a description will be given for a state before power is supplied to the inchworm actuator 100, i.e., a state in which the drive power supply 120 and the controller 130 are not energized.

In such a state in which the power of the inchworm actuator 100 is off, the upper and lower frames 103 and 104 and the first and second guides 101 and 102 which form a single body therewith are temporarily magnetized by the permanent magnets 105*a* and 105*b* embedded in the upper and lower frames 103 and 104. Therefore, the first and second support legs 111 and 112, which are made of a magnetic material and which are in contact with the first and second guides 101 and 102, are magnetically attracted and fixed to the first and second guides 101 and 102. Namely, when the power of the inchworm actuator 100 is off, the movable body 110 is clamped on the first and second guides 101 and 102 on which the first and second support legs 111 and 112 are located.

Figure 4:
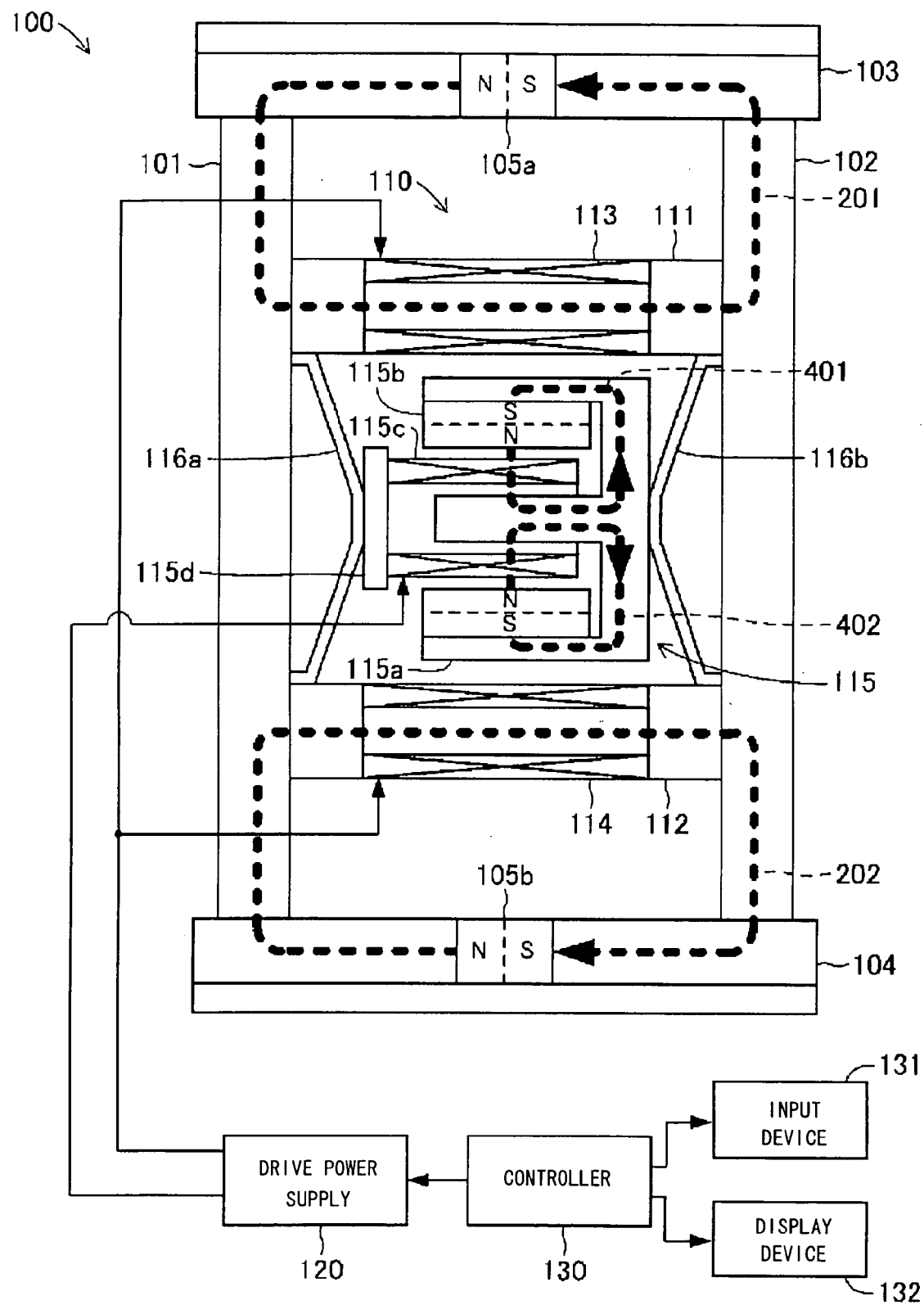
FIG. 4 is a front view of the inchworm actuator of FIG. 1 which schematically shows magnetic fields formed by permanent magnets and which is used for explaining the operation of the inchworm actuator.

In this state, as shown in FIG. 4, magnetic fields 201 and 202 of the same direction are produced in the first and second support legs 111 and 112 by the permanent magnets 105*a* and 105*b*. More specifically, magnetic field 201 is produced in the first support leg 111 mainly by permanent magnet 105a such that the magnetic flux from permanent magnet 105a extends through the left half of the upper frame 103, an upper portion of the first guide 101, the first support leg 111, upper portions of the second guides 102, and the right half of the upper frame 103 and returns to permanent magnet 105a. At the same time, magnetic field 202 is produced in the second support leg 112 mainly by permanent magnet 105b such that the magnetic flux from permanent magnet 105b extends through the left half of the lower frame 104, a lower portion of the first guide 101, the second support leg 112, lower portions of the second guides 102, and the right half of the lower frame 104 and returns to permanent magnet 105b.

When the inchworm actuator 100 is not energized, the voice coil motor 115c of the movable body 110 is in a resting state. Therefore, the movable body 110 is supported by the toggle mechanisms 116a and 116b at a resting position at which mechanical equilibrium exists.

The inchworm actuator 100 is turned on (energized) by the user in a state in which the magnetic fields 201 and 202 are produced in the first and second support legs 111 and 112 and the movable body 110 is at a standstill. Specifically, the user turns on the controller 130 by operating the input device 131. As a result, the controller 130 executes an unillustrated control program and enters a waiting state. Specifically, the controller 130 starts the operation of the drive power supply 120 and waits for an instruction from the user which instructs the controller 130 to execute a process of moving the movable body 110. In this waiting state as well, the movable body 110 is maintained stationary relative to the first and second guides 101 and 102 as in the above-described case.

When the controller 130 receives an instruction from the user which instructs the controller 130 to execute the process of moving the movable body 110, the controller 130 starts to move the movable body 110 in response to the instruction. Specifically, the controller 130 controls the operation of the drive power supply 120 so as to supply current to the magnetic field-forming coils 113 and 114 to thereby change the clamping force with which the first support leg 111 is clamped to the first and second guides 101 and 102 and the clamping force with which the second support leg 112 is clamped to the first and second guides 101 and 102 such that one of the clamping forces increases and the other of the clamping forces decreases. The clamping force for the first support leg 111 and the clamping force for the second support leg 112 may be changed such that the former is increased and the latter is decreased or such that the latter is increased and the former is decreased. However, the following description is for the case where the clamping force for the first support leg 111 is decreased and the clamping force for the second support leg 112 is increased.

Figure 5:
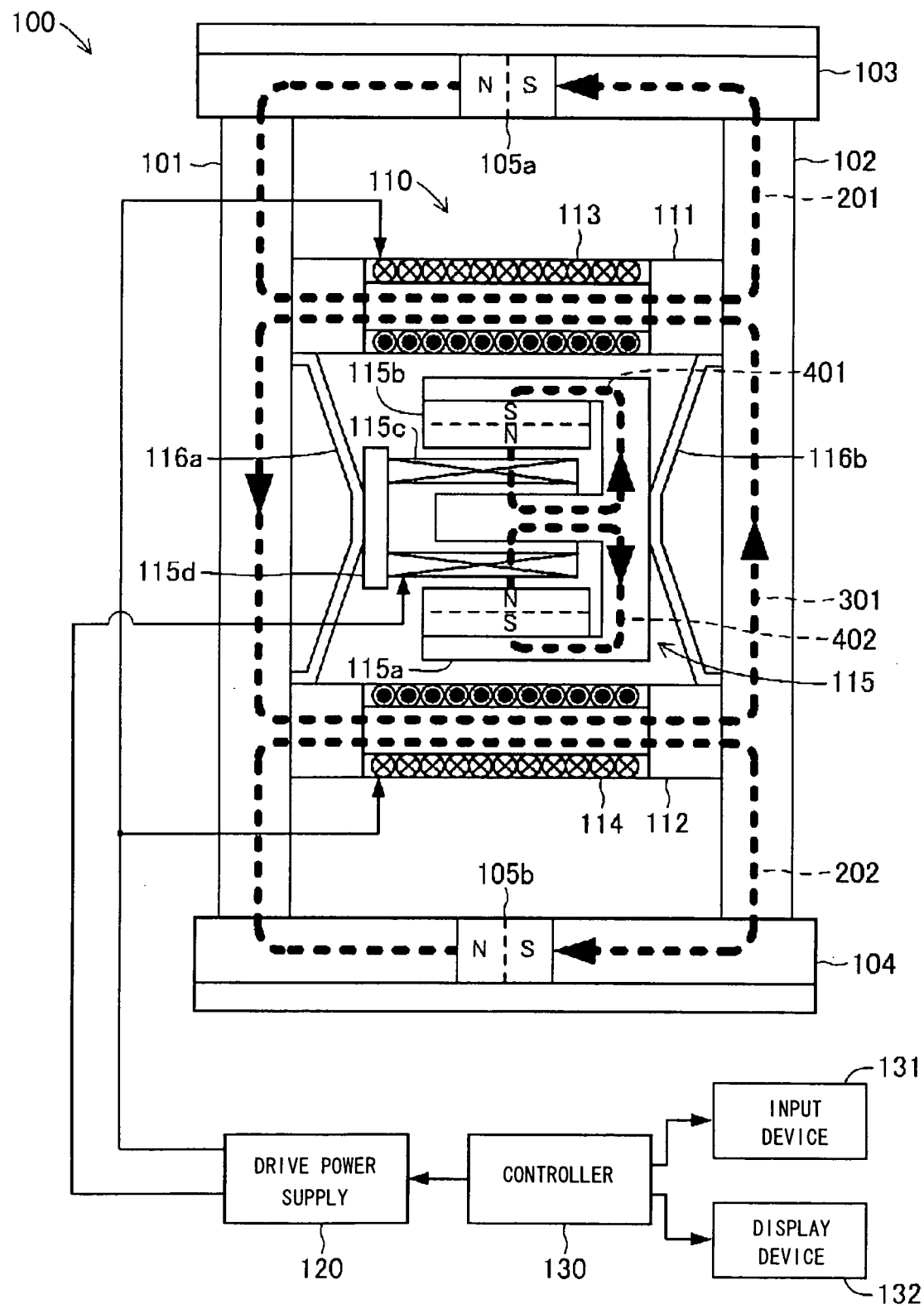
FIG. 5 is a front view of the inchworm actuator of FIG. 1 which schematically shows magnetic fields formed by the permanent magnets and magnetic field-forming coils and which is used for explaining the operation of the inchworm actuator.

Specifically, the controller 130 supplies current to the magnetic field-forming coils 113 and 114 in a direction such that the current flows from magnetic field-forming coil 113 towards magnetic field-forming coil 114 (i.e., it flows through magnetic field-forming coil 114 after having flowed through field-forming coil 113) (below, this direction will be referred to as the "positive direction"). The magnetic field-forming coils 113 and 114 are connected in series such that they become opposite in phase. Therefore, as shown in FIG. 5, a counterclockwise magnetic field 301 is formed which extends mainly through the first support leg 113, the first guide 101, the second support leg 114, and the second guides 102. At that time, in the first support leg 111, the direction of magnetic field 301 becomes opposite that of magnetic field 201 formed by permanent magnet 105a. Therefore, the magnetic force of magnetic field 201 with which the first support leg 111 is attracted and fixed to the first and second guides 101 and 102 is cancelled by that of magnetic field 301. As a result, the force with which the first support leg 111 is clamped to the first and second guides 102 decreases. In FIG. 5, the magnetic field-forming coils 113 and 114 are shown in cross section so as to clearly show the directions of the current flowing through the magnetic field-forming coils 113 and 114.

In contrast, in the second support leg 112, the direction of magnetic field 301 is the same as that of magnetic field 202 formed by permanent magnet 105b. Therefore, the magnetic force of magnetic field 202 with which the second support leg 112 is attracted and fixed to the first and second guides 101 and 102 is supplemented by that of magnetic field 301. As a result, the force with which the second support leg 112 is clamped to the first and second guides 102 increases. As a result of these operations, the first support leg 111 is unclamped (a state in which the clamping force which it exerts has decreased) and the second support leg 112 is clamped (a state in which the clamping force which it exerts has increased).

Next, the controller 130 supplies current to the voice coil 115c of the voice coil motor 115 while supplying current to the magnetic field-forming coils 113 and 114 in the above-mentioned positive direction so as to produce relative displacement of the voice coil 115c and the yoke 115a. At this time, the controller 130 supplies current to the voice coil 115c in a direction corresponding to a direction in which the movable body 110 is to be moved. Specifically, when the movable body 110 is to be moved towards the upper frame 103 (upward in the drawings), the controller 130 supplies current to the voice coil 115c in such a direction that the yoke 115a and the voice coil 115c repel each other.

Figure 6:
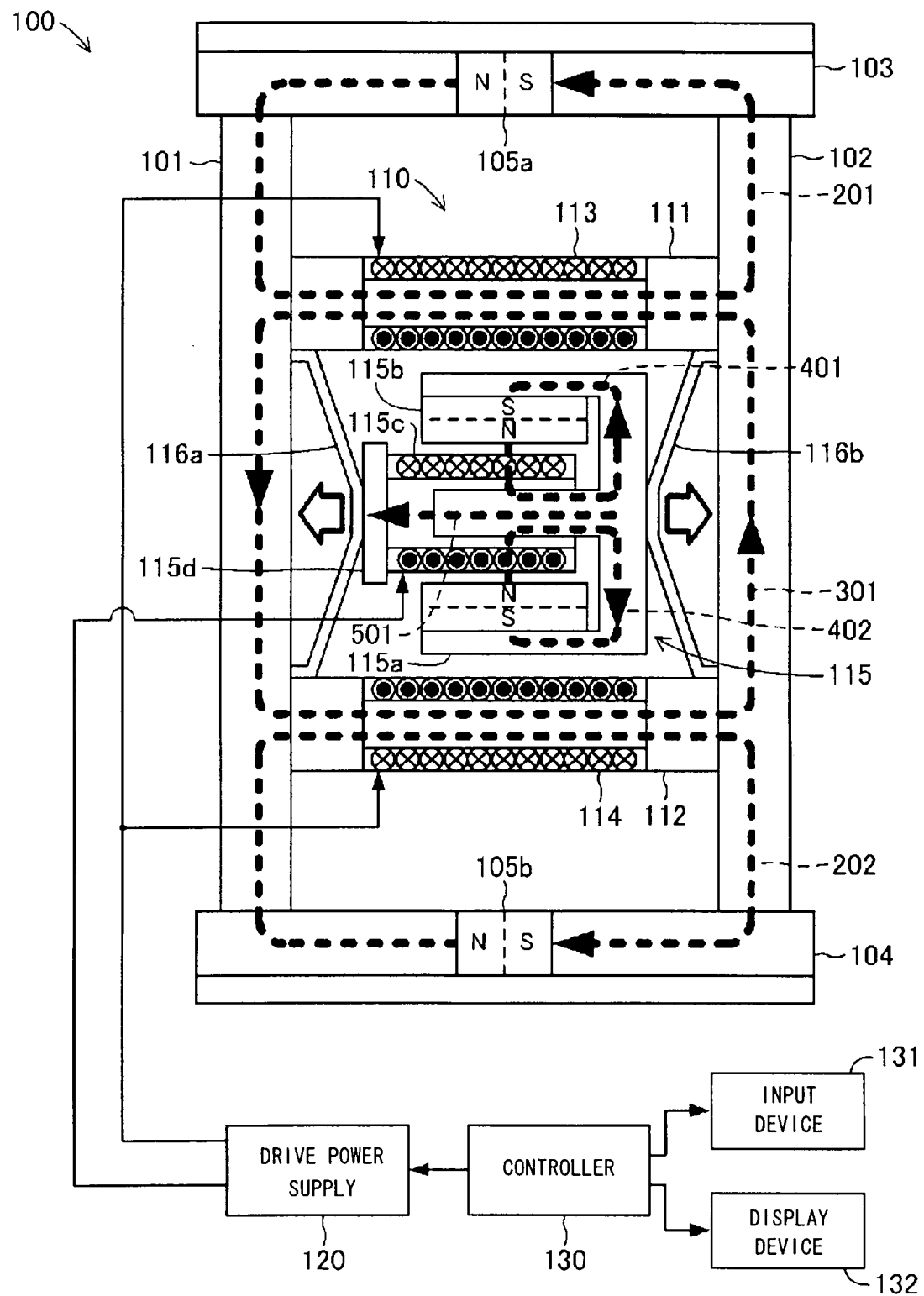
FIG. 6 is a front view of the inchworm actuator of FIG. 1 which schematically shows magnetic fields formed by the permanent magnets, the magnetic field-forming coils, and a voice coil and which is used for explaining the operation of the inchworm actuator.

In the present embodiment, as shown in FIG. 6, magnetic fields are formed in the yoke 115a by the permanent magnets 115b. Specifically, a counterclockwise magnetic field 401 is always formed in the upper half of the yoke 115a, and a clockwise magnetic field 402 is always formed in the lower half of the yoke 115a. Accordingly, the controller 130 supplies current to the voice coil 115c in such a direction that a magnetic field 501 is produced in a direction from the right side of the voice coil 115c towards the left side thereof. As a result, due to the Lorentz force, the yoke 115a and the voice coil 115c repel each other (see the solid line arrows in FIG. 6). Therefore, the toggle mechanisms 116a and 116b elastically deform such that they extend in the vertical direction. In FIG. 6, the voice coil 115c is shown in cross section in order to clearly show the direction of current flowing through it.

At this time, the upper and lower end portions of the toggle mechanisms 116a and 116b connected to the first support leg 111 and the second support leg 112, respectively, attempt to move in accordance with a reduction conversion ratio corresponding to the angle of the bent portions to which the yoke 115a and the voice coil 115c are connected. However, at this time, the first support leg 111 is in an unclamped state in which the clamping force with which the first support leg 111 is clamped to the first and second guides 101 and 102 has been decreased, and the second support leg 112 is in a clamped state in which the clamping force with which the second support leg 112 is clamped to the first and second guides 101 and 102 has been increased. Namely, the clamping force for the first support leg 111 has become smaller than that for the second support leg 112. Therefore, the first support leg 111 slides towards the upper frame 103 (upward in FIG. 6) along the first and second guides 101 and 102.

Figure 7:
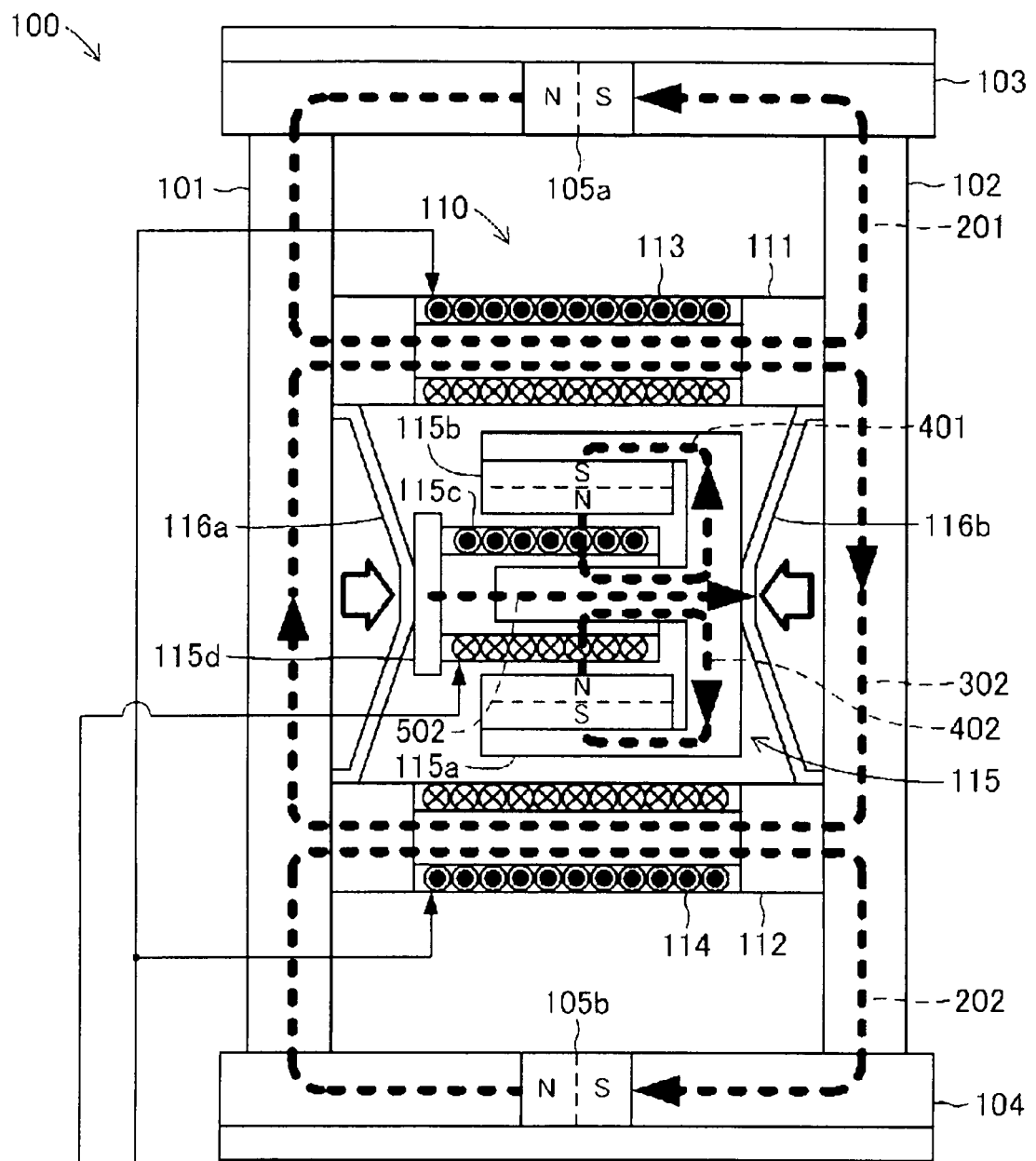
FIG. 7 is a front view of the inchworm actuator of FIG. 1 which schematically shows magnetic fields formed by the permanent magnets, the magnetic field-forming coils, and the voice coil and which is used for explaining the operation of the inchworm actuator.
Figure 7:
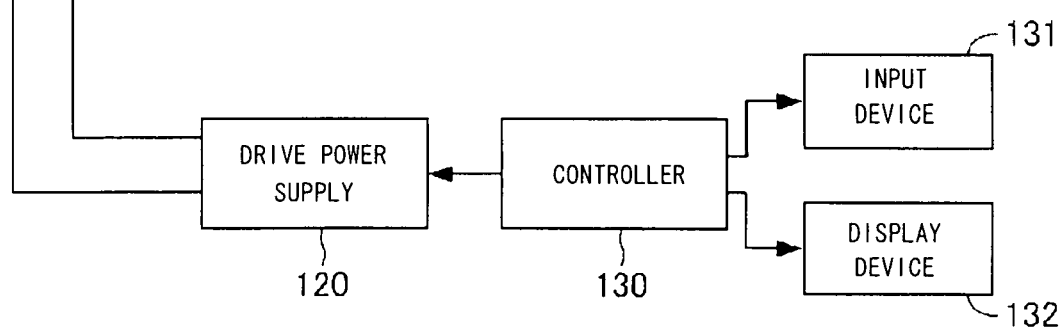

Next, the controller 130 brings the first support leg 111 into a clamped state and the first support leg 111 into an unclamped state by supplying current to the magnetic field-forming coils 113 and 114 in the opposite direction while maintaining the current flowing through the voice coil 115c. Specifically, as shown in FIG. 7, the controller 130 supplies current to the magnetic field-forming coils 113 and 114 in a direction such that the current flows from magnetic field-forming coil 114 towards magnetic field-forming coil 113 (this direction will be referred to below as the "negative direction"). The magnetic field-forming coils 113 and 114 are connected in series such that they become opposite in phase. Therefore, a clockwise magnetic field 302 is formed which extends mainly through the first support leg 111, the second guide 102, the second support leg 112, and the first guides 101. In FIG. 7, the magnetic field-forming coils 113 and 114 and the voice coil 115c are shown in cross section in order to clearly show the directions of currents flowing through the magnetic field-forming coils 113 and 114 and the voice coil 115c.

At this time, in the first support leg ill, the direction of magnetic field 302 is the same as that of magnetic field 201 formed by permanent magnet 105a. Therefore, the magnetic force of magnetic field 201 with which the first support leg 111 is attracted and fixed to the first and second guides 101 and 102 is supplemented by that of the magnetic field 302. As a result, the force with which the first support leg 111 is clamped to the first and second guides 102 increases. In contrast, in the second support leg 112, the direction of magnetic field 302 becomes opposite that of magnetic field 202 formed by permanent magnet 105b. Therefore, the magnetic force of magnetic field 202 with which the second support leg 112 is attracted and fixed to the first and second guides 101 and 102 is cancelled by that of magnetic field 302. As a result, the force with which the second support leg 112 is clamped to the first and second guides 102 decreases.

Next, the controller 130 supplies current to the voice coil 115c of the voice coil motor 115 while supplying current to the magnetic field-forming coils 113 and 114 in the above-described negative direction so as to produce a relative displacement of the voice coil 115c and the yoke 115a. At this time, the controller 130 supplies the current in such a direction that the yoke 115a and the voice coil 115c attract each other. Specifically, the controller 130 supplies current to the voice coil 115c in such a direction that a magnetic field 502 is produced in a direction from the left side of the voice coil 115c towards the right side thereof. As a result, due to the Lorentz force, the yoke 115a and the voice coil 115c attract each other (see the solid line arrows in FIG. 7). Therefore, the toggle mechanisms 116a and 116b elastically deform such that they contract in the vertical direction.

In this case as well, the upper and lower end portions of the toggle mechanisms 116a and 116b connected to the first support leg 111 and the second support leg 112, respectively, attempt to move in accordance with a reducing conversion ratio corresponding to the angle of the bent portions to which the yoke 115a and the voice coil 115c are connected. In this case, the first support leg 111 is in a clamped state in which the clamping force with which the first support leg 111 is clamped to the first and second guides 101 and 102 has been increased, and the second support leg 112 is in an unclamped state in which the clamping force with which the second support leg 112 is clamped to the first and second guides 101 and 102 has been decreased. Namely, the clamping force for the second support leg 112 has become smaller than that for the first support leg 111. Therefore, the second support leg 112 slides towards the upper frame 103 (upward in FIG. 7) along the first and second guides 101 and 102.

As a result, the movable body 110 moves towards the upper frame 103 as a single unit. The controller 130 can continuously move the movable body 110 towards the upper frame 103 by repeating the above-described series of operations, i.e., the operation of unclamping the first support leg 111 and clamping the second support leg 112, the operation of extending and contracting the toggle mechanisms 116a and 116b, and the operation of clamping the first support leg 111 and unclamping the second support leg 112. Namely, the operation of driving the magnetic field-forming coils 113 and 114 and the voice coil 115c by the controller 130 so as to execute the above-described series of operations corresponds to the inchworm drive operation according to the present invention, and the controller 130 which performs the inchworm drive operation corresponds to the inchworm control means according to the present invention.

In the case where the movable body 110 is to be moved towards the lower frame 104 (downward in the drawings) in the above-described state in which the first support leg 111 is unclamped and the second support leg 112 is clamped, the controller 130 controls the drive power supply 120 such that current flows through the voice coil 115c in the opposite direction.

Namely, in a state in which the first support leg 111 is unclamped and the second support leg 112 is clamped, the controller 130 supplies current to the voice coil 115c in such a direction that magnetic field 502 is produced in a direction from the left side of the voice coil 115c towards the right side thereof. As a result, due to the Lorentz force, the yoke 115a and the voice coil 115c attract each other. Therefore, the toggle mechanisms 116a and 116b elastically deform such that they contract in the vertical direction. In this case, the clamping force for the first support leg 111 is smaller than that for the second support leg 112. Therefore, the first support leg 111 slides toward the lower frame 104 (downward in the drawings) along the first and second guides 101 and 102.

Next, while maintaining the current flowing through the voice coil 115c, the controller 130 supplies current to the magnetic field-forming coils 113 and 114 in the above-described negative direction so as to form the above-described magnetic field 302 to thereby clamp the first support leg 111 and unclamp the second support leg 112. Subsequently, while maintaining the current flowing through the magnetic field-forming coils 113 and 114 in the above-described negative direction, the controller 130 supplies current to the voice coil 115c of the voice coil motor 115 in the opposite direction such that the voice coil 115c and the yoke 115a repel each other due to the Lorentz force. Specifically, the controller 130 supplies current to the voice coil 115c in such a direction that magnetic field 501 is produced in a direction from the right side of the voice coil 115c towards the left side thereof. As a result, the voice coil 115c and the yoke 115a repel each other and the toggle mechanisms 116a and 116b elastically deform such that they expand in the vertical direction.

In this case, the clamping force for the second support leg 112 is smaller than that for the first support leg 111. Therefore, the second support leg 112 slides toward the lower frame 104 (downward in the drawings) along the first and second guides 101 and 102. As a result, the movable body 110 moves towards the lower frame 104 as a whole. The controller 130 can continuously move the movable body 110 towards the lower frame 104 by repeating the above-described series of operations, and specifically, the operation of clamping the first support leg 111 and unclamping the second support leg 112, the operation of contracting and extending the toggle mechanisms 116a and 116b, and the operation of unclamping the first support leg 111 and clamping the second support leg 112.

Namely, the inchworm actuator 100 moves the movable body 110 along the first and second guides 101 and 102 by inchworm drive which is the combination of driving of the magnetic field-forming coils 113 and 114 for clamping and unclamping the first and second support legs 111 and 112 and driving of the voice coil motor 115c for expanding and contracting the toggle mechanisms 116a and 116b. After having moved the movable body 110 by an amount instructed by the user, the controller 130 stops the supply of electricity to the magnetic field-forming coils 113 and 114 and the voice coil 115c. As a result, the magnetic fields 301, 302, 401, and 402 produced by the magnetic field-forming coils 113 and 114 and the voice coil 115c disappear. Therefore, the first and second support legs 111 and 112 are again clamped. Namely, the movable body 110 is held at the position where the movable body 110 has stopped its movement.

In the above description of operation, the controller 130 controls the operation of the voice coil motor 115 by switching the voice coil 115c of the voice coil motor 115 between an energized state in which a predetermined amount of current is supplied to the voice coil 115c and an non-energized state in which no current is supplied to the voice coil 115c. The controller 130 may be configured to operate the voice coil 115c by controlling the current supplied to the voice coil 115c while always supplying a fixed current (i.e., a bias current) to the voice coil 115c.

When the voice coil 115c is controlled by using such a bias current, the toggle mechanisms 116a and 116b deform from a reference state in which they have been deformed by an amount corresponding to the bias current. Namely, the toggle mechanisms 116a and 116b change the amount of displacement of the opposite end portions thereof per unit relative movement of the yoke 115a and the voice coil 115c in accordance with the bending angle of the bent portions to which the yoke 115a and the voice coil 115c are connected. Thus, the reducing conversion ratio of the toggle mechanisms 116a and 116b corresponds to a bending angle range within which the angle of the bent portions changes while a displacement is input to the toggle mechanisms 116a and 116b. Therefore, the controller 130 can change the displacement reduction ratio by changing the bending angle of the bent portions of the toggle mechanisms 116a and 116b in advance by controlling the bias current supplied to the voice coil 115c.

Thus, as shown in FIG. 3, the controller 130 can move the movable body 110 at a rapid feed rate (coarse movement) by driving the voice coil 115c in a state in which the displacement reduction ratio of the toggle mechanisms 116a and 116b is made large (for example, within a range surrounded by dashed line L in FIG. 3) and can move the movable body 110 with a high resolution (fine movement) and a large propelling force (large torque) by driving the voice coil 115c in a state in which the displacement reduction ratio of the toggle mechanisms 116a and 116b is made small (for example, within a range surrounded by dashed line S in FIG. 3).

In the above description, the operation of moving the movable body 110 is described as being started from a state in which the first support leg 111 is unclamped and the second support leg 112 is clamped. However, as described above, the operation of moving the movable body 110 may be started from a state in which the first support leg 111 is clamped and the second support leg 112 is unclamped.

Namely, when the movable body 110 is to be moved toward the upper frame 103 from the state in which the first support leg 111 is clamped and the second support leg 112 is unclamped, the controller 130 forms magnetic field 502 by controlling the operation of the voice coil 115c so as to contract the toggle mechanisms 116a and 116b in such a state. After having moved the second support leg 112 towards the upper frame 103, the controller 130 forms magnetic field 301 by controlling the operations of the magnetic field-forming coils 113 and 114 so as to unclamp the first support leg 111 and clamp the second support leg 112. Subsequently, the controller 130 forms magnetic field 501 by controlling the operation of the voice coil 115c so as to extend the toggle mechanisms 116a and 116b. Since the first support leg 111 moves towards the upper frame 103 as a result of the expansion of the toggle mechanisms 116a and 116b, the entire movable body 110 moves towards the upper frame 103.

In contrast, when the movable body 110 is to be moved toward the lower frame 104 from the state in which the first support leg 111 is clamped and the second support leg 112 is unclamped, the controller 130 forms magnetic field 501 by controlling the operation of the voice coil 115c so as to expand the toggle mechanisms 116a and 116b in such a state. After having moved the second support leg 112 towards the lower frame 104, the controller 130 forms magnetic field 302 by controlling the operation of the magnetic field-forming coils 113 and 114 so as to unclamp the first support leg 111 and clamp the second support leg 112. Subsequently, the controller 130 forms magnetic field 502 by controlling the operation of the voice coil 115c so as to contract the toggle mechanisms 116a and 116b. Since the first support leg 111 moves towards the lower frame 104 as a result of the contraction of the toggle mechanisms 116a and 116b, the entire movable body 110 moves towards the lower frame 104.

The combination of the direction of current flowing through the magnetic field-forming coils 113 and 114 and the direction of current flowing through the voice coil 115c for moving the movable body 110 is selected and set in the controller 130 in advance by the user.

As can be understood from the above description of operation, according to the above-described embodiment, the inchworm actuator 100 is configured such that the first and second support legs 111 and 112 of the movable body 110 are moved relative to each other by the toggle mechanisms 116a and 116b which convert the displacement of the voice coil motor 115 (expansion/contraction means) in accordance with a conversion ratio corresponding to the amount of displacement of the voice coil motor 115. In this case, the toggle mechanisms 116a and 116b convert the amount of input displacement (displacement of the voice coil motor 115) to the amount of output displacement in accordance with a reducing conversion ratio which changes depending on the amount of input displacement and move the first and second support legs 111 and 112 relative to each other by the amount of output displacement. As a result, the inchworm actuator 100 can freely change the displacement speed and positioning accuracy of the movable body 110 and propelling force for moving the movable body 110 by selecting a proper reducing conversion ratio within a range in which the reducing conversion ratio of the toggle mechanisms 116a and 116b changes non-linearly.

In the inchworm actuator 100 of the above-described embodiment, the movable body 110 which comprises the first and second support legs 111 and 112 formed of a magnetic material, the magnetic field-forming coils 113 and 114, the voice coil motor 115, and the toggle mechanisms 116a and 116b is disposed with respect to the first and second guides 101 and 102 which are formed of a magnetic material. Since the movable body 110 moves along the first and second guides 101 and 102, the inchworm actuator 100 can accurately and stably move the movable body 110. In the inchworm actuator 100, when the magnetic field-forming coils 113 and 114 are not energized, the first and second support legs 111 and 112 can be magnetically attracted and fixed to the first and second guides 101 and 102 by the permanent magnets 105a and 105b which produce magnetic fields in the first and second support legs 111 and 112. Namely, the inchworm actuator 100 can maintain the position of the movable body 110 when no electricity is supplied to the movable body 110 while realizing the operation of alternately clamping and unclamping the first and second support legs 111 and 112. Since the permanent magnets 105a and 105b are provided on the first and second guides 101 and 102, the structure of the movable body 110 can be made simple and the weight of the movable body 110 can be reduced. As a result, the inchworm actuator 100 can maintain the position of the movable body 110 without making the structure of the movable body 110 complex and without increasing the size and weight of the movable body 110 compared with a conventional movable body 110.

The present invention is not limited to the above-described embodiment, and it may be modified in various ways without departing from the object of the present invention. In the modifications described below, structural portions which are shown in the reference drawings and are identical to those of the above-described embodiment are denoted by reference numerals which are the same as or correspond to those used for the corresponding structural portions of the above-described embodiment, and descriptions thereof will not be repeated.

In the above-described embodiment, the permanent magnets 105a and 105b are disposed on the upper and lower frames 103 and 104. Namely, the permanent magnets 105a and 105b are indirectly mounted on the first and second guides 101 and 102 through the upper and lower frames 103 and 104. However, the position and number of permanent magnets 105a and 105b are not limited to those employed in the above-described embodiment so long as the permanent magnets 105a and 105b can form magnetic fields in the same direction in the first and second support legs 111 and 112 through the first and second guides 101 and 102.

Figure 8:
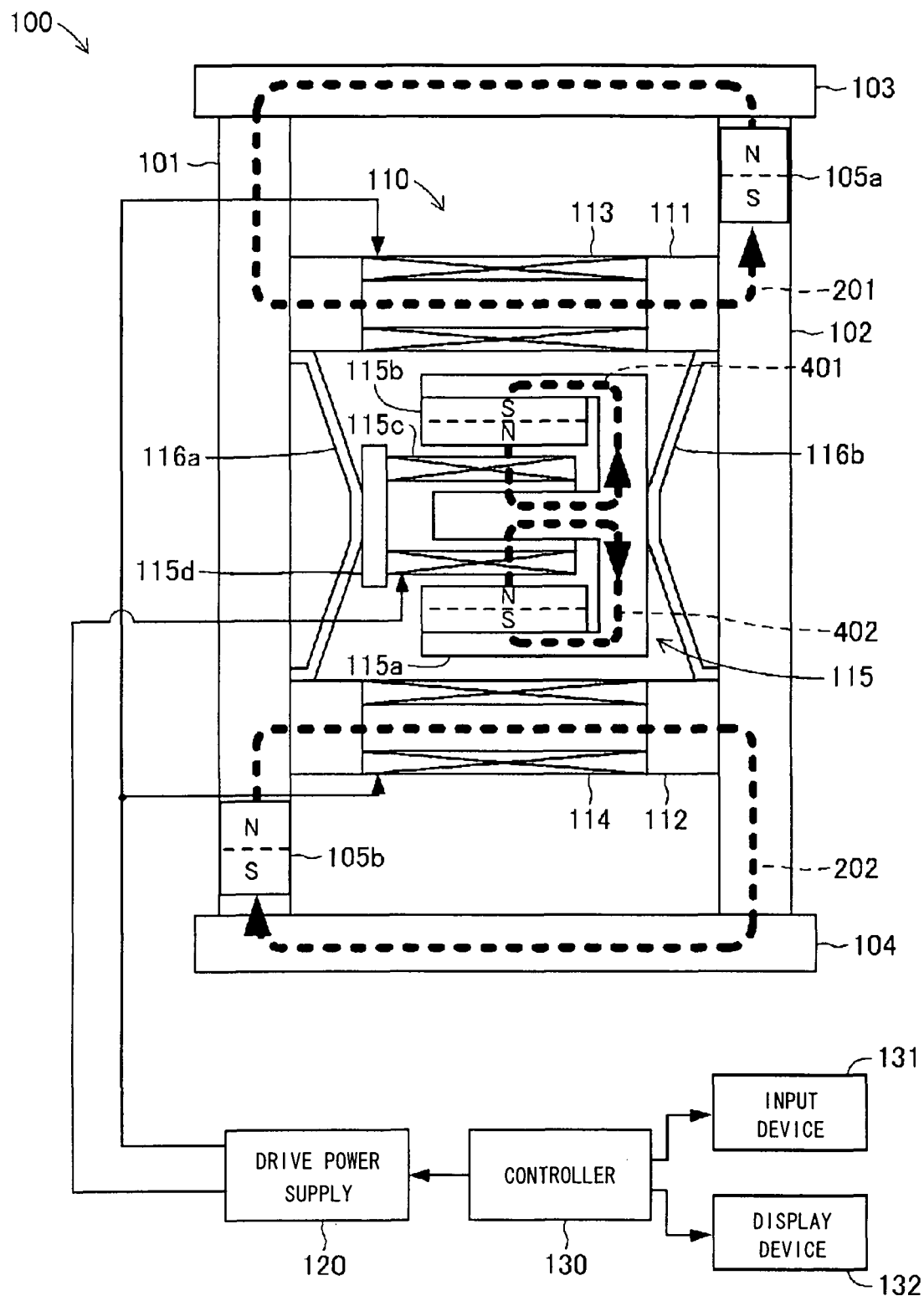
FIG. 8 is a front view schematically showing the overall structure of an inchworm actuator according to a modified embodiment of the present invention along with magnetic fields formed by permanent magnets.
Figure 9:
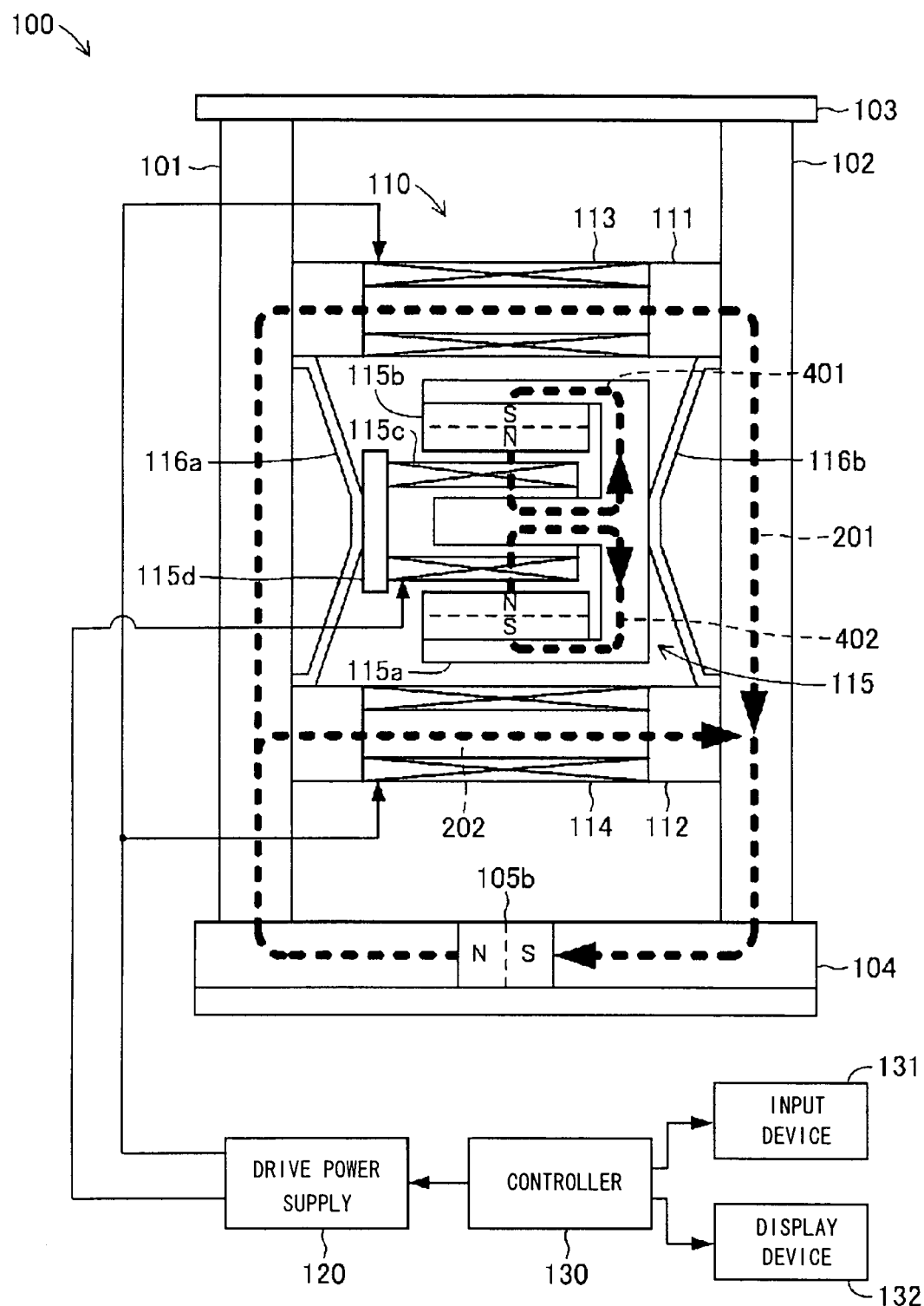
FIG. 9 is a front view schematically showing the overall structure of an inchworm actuator according to another modified embodiment of the present invention along with magnetic fields formed by permanent magnets, magnetic field-forming coils, and a voice coil.

For example, as shown in FIG. 8, the permanent magnets 105a and 105b may be mounted directly on the first and second guides 101 and 102. Alternatively, although not shown in the drawings, the permanent magnets 105a and 105b may be mounted directly on the first and second support legs 111 and 112. This configuration simplifies the structure of the upper and lower frames 103 and 104. As shown in FIG. 9, it is possible to dispose only a single permanent magnet 105b on the lower frame 104. This simplifies the structure of the inchworm actuator 100. In this case, the single permanent magnet 105b may be disposed on a component other than the lower frame 104, such as on the upper frame 105a, the first guide 101, or the second guide 102.

In the above-described embodiment, the magnetic field-forming coils 113 and 114 are provided on the first and second support legs 111 and 112. However, the positions and number of magnetic field-forming coils 113 and 114 are not limited to those employed in the above-described embodiment so long as the magnetic field-forming coils 113 and 114 can produce magnetic fields of opposite directions in the first and second support legs 111 and 112 through the first and second guides 101 and 102.

Figure 10:
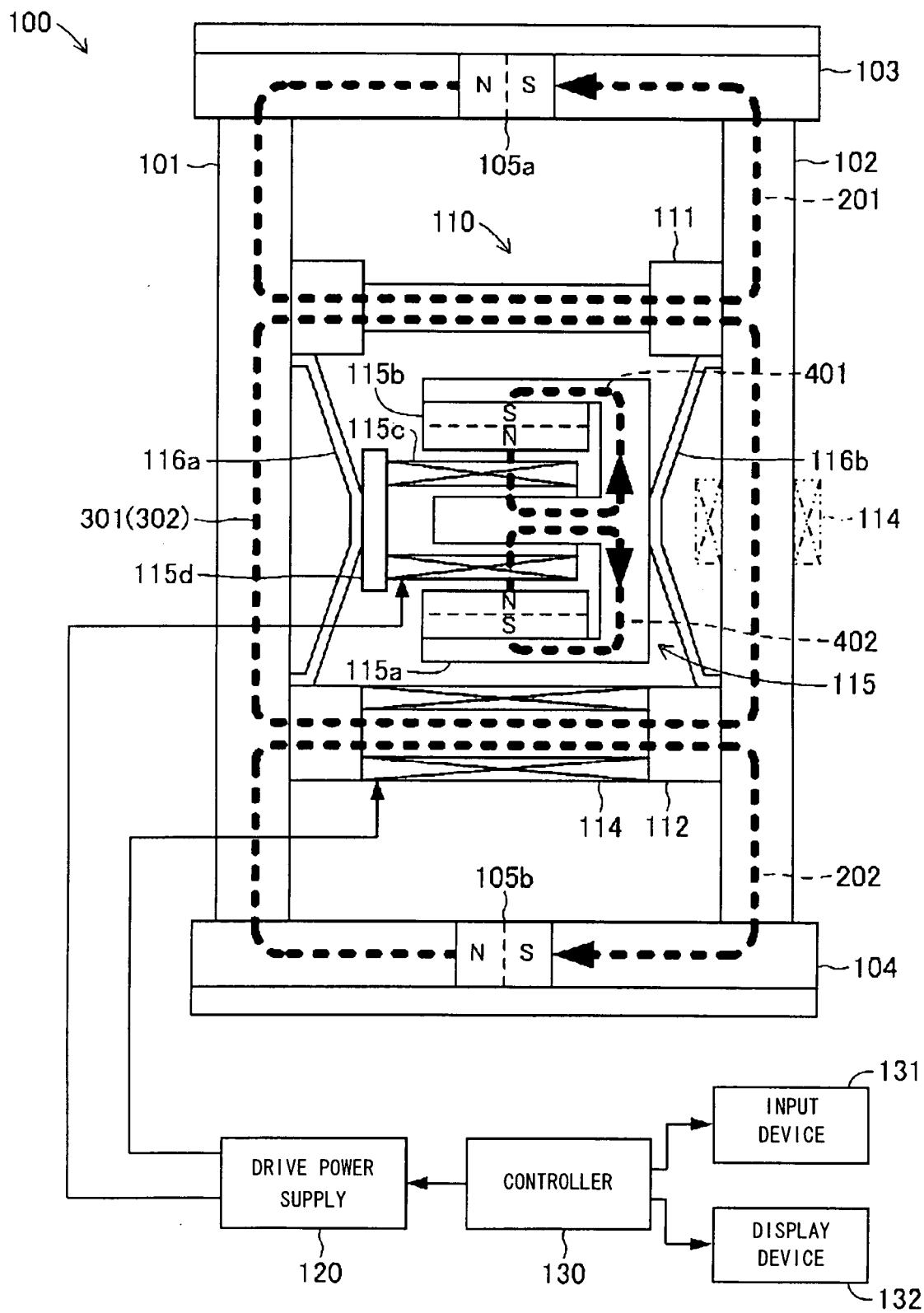
FIG. 10 is a front view schematically showing the overall structure of an inchworm actuator according to still another modified embodiment of the present invention along with magnetic fields formed by permanent magnets, a magnetic field-forming coil, and a voice coil.

For example, as shown in FIG. 10, it is possible to dispose only a single magnetic field-forming coil 114 on the second support leg 112. This simplifies the structure of the inchworm actuator 100. In this case, as indicated by alternate long and two short dashed lines in FIG. 10, the magnetic field-forming coil 114 may be provided on the second guides 102 (or the first guide 101) at a position between the first and second support legs 111 and 112. In this case, the magnetic field-forming coil 114 may be fixedly provided on the second guides 102 or may be configured such that the magnetic field-forming coil 114 moves on the second guides 102 with the movable body 110.

In the above-described embodiment, the magnetic field-forming coils 113 and 114 are connected in series such that they become opposite in phase. This enables the two magnetic field-forming coils (i.e., the magnetic field-forming coils 113 and 114) to be commonly controlled by the single drive power supply 120, thereby simplifying the structure of the inchworm actuator. However, the magnetic field-forming coils 113 and 114 may be individually controlled by the drive power supply 120. Alternatively, dedicated drive power supplies 120 may be provided for the magnetic field-forming coils 113 and 114.

In the above-described embodiment, the first and second support legs 111 and 112 are configured such that they are in three-point contact with the first and second guides 101 and 102 for sliding movement. However, the method of supporting the first and second support legs 111 and 112 is not limited to that employed in the above-described embodiment so long as the first and second support legs 111 and 112 can slide on the first and second guides 101 and 102. For example, the first and second support legs 111 and 112 and the first and second guides 101 and 102 may be configured as follows. Rollers may be provided on portions of the first and second support legs 111 and 112 which come into contact with the first and second guides 101 and 102, and slide portions of the first and second guides 101 and 102 on which the rollers roll may be formed into the shape of a rail having a flat surface, a concave surface, or a V-shaped surface.

In the above-described embodiment, the movable body 110 is configured to move relative to the first and second guides 101 and 102 in the vertical direction in the drawings. However, needless to say, the movable body 110 may move vertically or horizontally.

In the above-described embodiment, the movable body 110 is configured to move relative to the first and second guides 101 and 102. Namely, the first and second guides 101 and 102 correspond to the stationary body of the present invention. However, the displacement or movement of the movable body 110 is movement relative to the first and second guides 101 and 102. Accordingly, the inchworm actuator 100 may be configured such that the movable body 110 is fixed and the first and second guides 101 and 102 are moved relative to the movable body 110. Namely, the inchworm actuator 100 may be configured such that the movable body 110 moves relative to the first and second guides 101 and 102, or it may be configured such that the first and second guides 101 and 102 move relative to the movable body 110.

In the above-described embodiment, the voice coil motor 115 is used as the expansion/contraction means of the present invention. However, the expansion/contraction means of the present invention is not limited to the voice coil motor 115 employed in the above-described embodiment and may be any actuator so long as the actuator forms a portion of the movable body 110 and displaces or deforms upon receipt of electric energy or magnetic energy. For example, in place of the voice coil motor 115, a 2-stage expansion/contraction device 140 as shown in FIG. 11 may be used as the expansion/contraction means.

The 2-stage expansion/contraction device 140 is mainly composed of an electromagnet 141 and first and second movable pieces 142 and 143 disposed on opposite sides of the electromagnet 141. The electromagnet 141 is formed by winding a magnetic field-forming coil 141b around a soft iron core 141a and is controlled by the controller 130. In this electromagnet 141, when current is supplied to the magnetic field-forming coil 141b, the soft iron core 141a is temporarily magnetized and functions as a magnet. The first movable piece 142 is a magnetic member fixed to a central portion of toggle mechanism 116a with a first clearance C1 which is formed between the first movable piece 142 and one magnetic pole (on the left side in FIG. 11) of the electromagnet 141. The second movable piece 143 is a magnetic member fixed to a central portion of toggle mechanism 116b with a second clearance C2 which is formed between it and the other magnetic pole (on the right side in FIG. 11) of the electromagnet 141 and which is greater than the first clearance C1.

One spring 144a is disposed between the first movable piece 142 and the left-hand magnetic pole of the electromagnet 141, and another spring 144b is disposed between the second movable piece 143 and the right-hand magnetic pole of the electromagnet 141. The springs 144a and 144b are elastic members which push the first and second movable pieces 142 and 143 such that they move away from the corresponding magnetic poles of the electromagnet 141. The electromagnet 141 is supported by the toggle mechanisms 116a and 116b through the springs 144a and 144b and the first and second movable pieces 142 and 143.

Figure 11:
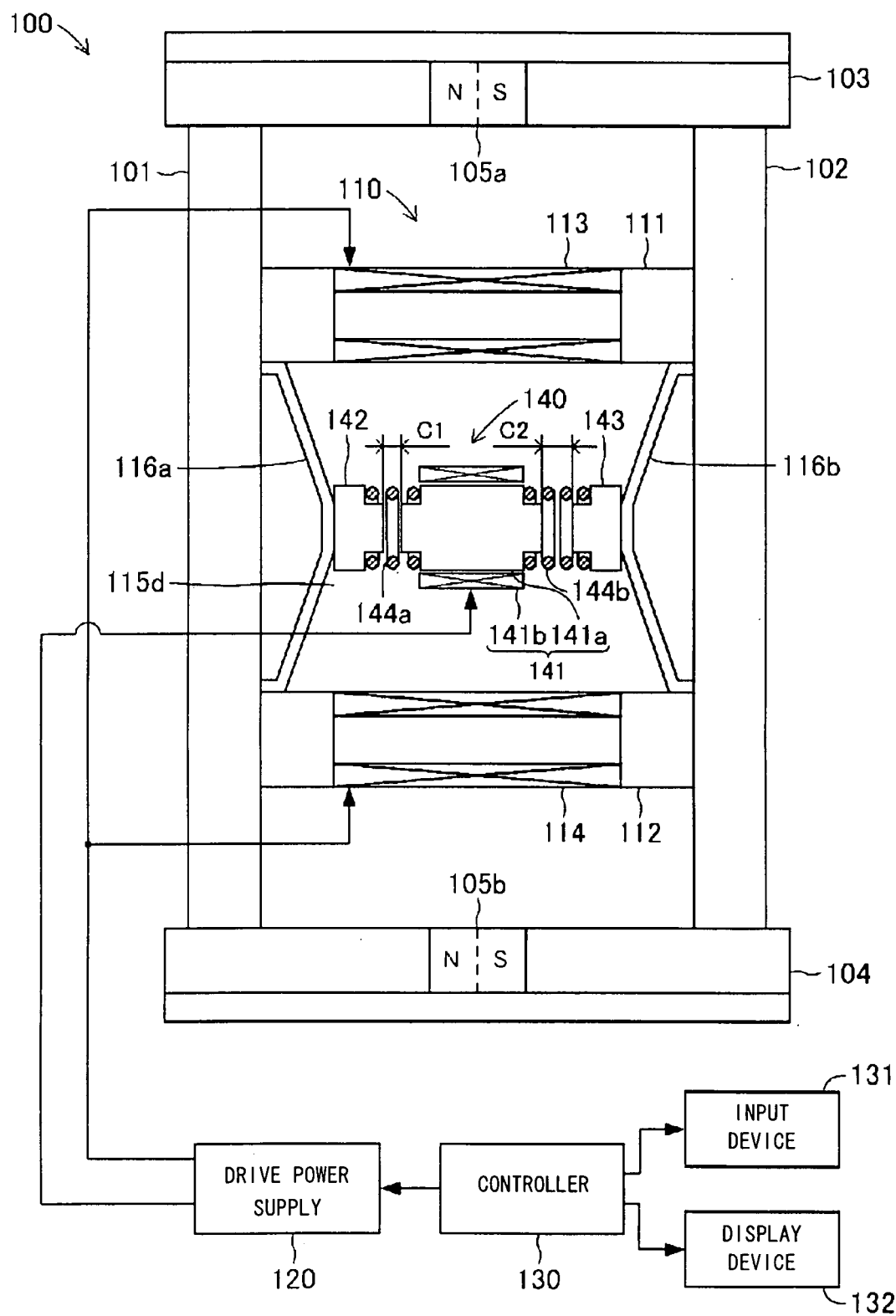
FIG. 11 is a front view schematically showing the overall structure of an inchworm actuator according to still another modified embodiment of the present invention.

In the 2-stage expansion/contraction device 140 configured as described above, when a current which generates a magnetic force sufficient for magnetically attracting and holding first movable piece 142 is intermittently supplied to the coil 141b, the first movable piece 142 repeatedly moves leftward and rightward in FIG. 11. As a result, the movable body 110 is moved by an amount obtained by reducing conversion of the amount of displacement of the first movable piece 142 (the first clearance C1). When a current which generates a magnetic force sufficient for magnetically attracting and holding the second movable piece 143 is intermittently supplied to the coil 141b, the second movable piece 143 repeatedly moves leftward and rightward in FIG. 11. In this case, the current which generates a magnetic force sufficient for magnetically attracting and holding the second movable piece 143 is greater than the current which generates a magnetic force sufficient for magnetically attracting and holding the first movable piece 142. Accordingly, in this case, the first movable piece 142 is attracted and held by one magnetic pole (on the left hand side in FIG. 11) of the electromagnet 141. As a result, the movable body 110 is moved by an amount obtained by reducing conversion of the amount of displacement of the second movable piece 143 (the second clearance C2).

In this case, since the amount of displacement of the second movable piece 143 is greater than that of the first movable piece 142, the movable body 110 moves with a reducing conversion ratio greater than that in the case where the movable body 110 moves as a result of displacement of the first movable piece 142. Namely, the inchworm actuator 100 can finely move the movable body 110 (perform fine feed) by the displacement of the first movable piece 142 and can coarsely move the movable body 110 (perform rapid feed) by the displacement of the second movable piece 143.

In place of the 2-stage expansion/contraction device 140, a single-stage expansion/contraction device may be used. The single-stage expansion/contraction device includes a magnetic member disposed on toggle mechanism 116a and an electromagnet disposed on toggle mechanism 116b. By controlling the supply of electricity to the electromagnet, the magnetic member is moved toward the electromagnet and is separated therefrom. The expansion/contraction means is not limited to the voice coil motor 115 and the 2-stage expansion/contraction device 140 and may be configured using, for example, a solenoid, a piezoelectric element, or a magnetostrictive element. When a piezoelectric element or a magnetostrictive element is used as the expansion/contraction means, the displacement conversion mechanism may be configured to directly input deformation of the piezoelectric or magnetostrictive element as the input displacement, or it may be configured to input, as the input displacement, displacement of a member which displaces as a result of deformation of the piezoelectric or magnetostrictive element.

In the above-described embodiment, the toggle mechanisms 116a and 116b, which each include two links and a single slider, are used as the displacement conversion mechanism of the present invention. However, the displacement conversion mechanism is not limited to the toggle mechanisms 116a and 116b employed in the above-described embodiment so long as a mechanism which is employed can change the conversion ratio for amplifying conversion or reducing conversion of the input displacement (displacement or deformation of the expansion/contraction means). For example, a link mechanism (e.g., a slider crank mechanism) other than the toggle mechanism, a force boosting mechanism, a cam mechanism, a gear train, or a hydraulic mechanism may be used as the displacement conversion mechanism. A plurality of displacement conversion mechanisms may be arranged in series in order to increase or decrease the ratio at which the input displacement is increased or reduced. The link mechanism which constitutes the displacement conversion mechanism need not be composed of completely separate components (i.e., a plurality of links and joints which movably connect the links together), and it encompasses one which functions essentially as a link mechanism. Namely, as in the case of the toggle mechanisms 116a and 116b in the above-described embodiment, a link mechanism can be configured by a single member which has two movable portions connected through an elastically deformable portion.

In the above-described embodiment, the toggle mechanisms 116a and 116b are used as a displacement reduction mechanism which reduces the input displacement by reducing conversion and outputs the reduced displacement. However, the toggle mechanisms 116a and 116b may be used as a displacement expansion mechanism which increases the input displacement by amplifying conversion and outputs the increased displacement. Specifically, the opposite end portions of the toggle mechanisms 116a and 116b can be connected to the opposite ends of the expansion/contraction means (in the case where the voice coil motor 115 serves as the expansion/contraction means, the opposite end portions can be connected to the yoke 115*a* and the support plate 115*d*), and the central portions of the toggle mechanisms 116*a* and 116*b* can be connected to the first and second support legs 111 and 112. Thus, the toggle mechanisms 116*a* and 116*b* can function as a displacement expansion mechanism.

In the above-described embodiment, the inchworm actuator 100 is configured such that the movable body 110 moves relative to the stationary body (the first and second guides 101 and 102). However, the inchworm actuator 100 may be configured without using such a stationary body. Examples of the structure of the inchworm actuator 100 having no stationary body will be described below. The inchworm actuators 100 according to other embodiments of the present invention are shown in FIGS. 12 to 15 in a more simplified manner compared with the above-described embodiment, and the drive power supply 120, the controller 130, the input device 131, and the display device 132 are not illustrated in these drawings.

Figure 12:
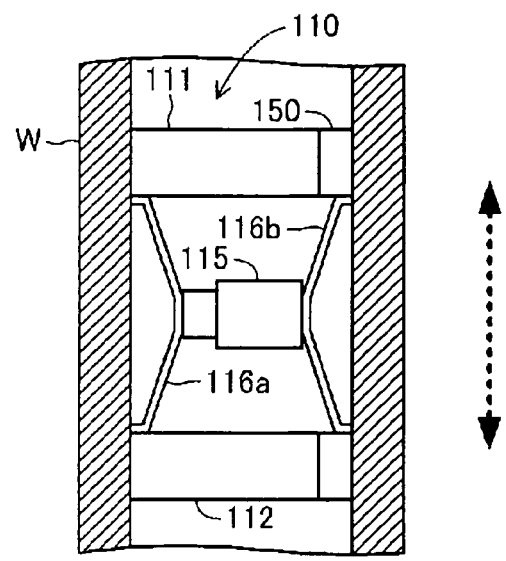
FIG. 12 is a front view schematically showing the overall structure of an inchworm actuator according to still another modified embodiment of the present invention.

In the inchworm actuator 100 shown in FIG. 12, the movable body 110 is mainly composed of a first support leg 111, a second support leg 112, a voice coil motor 115, toggle mechanisms 116*a* and 116*b*, and clamp elements 150. The clamp elements 150 are piezoelectric elements which expand and contract by the piezoelectric effect and are provided at the right ends of the first and second support legs 111 and 112. The clamp elements 150 extend and contract under the control of the controller 130 to thereby increase and decrease the lengths of the first and second support legs 111 and 112.

The inchworm actuator 100 configured as described above is used such that the movable body 110 is disposed inside a stationary body W formed into a shape (e.g., a tubular shape) which can support the movable body 110 by holding the opposite end portions of the first and second support legs 111 and 112 with respect to the direction along which they expand and contract. Specifically, in the inchworm actuator 100, when the controller 130 drives the voice coil motor 115 and the clamp element 150 (inchworm drive), the movable body 110 moves within the stationary body W (see the dashed line arrow in FIG. 12). In this case, since the movable body 110 is mechanically clamped within the stationary body W as a result of expansion of the clamp elements 150, the first and second support legs 111 and 112 and the stationary body W need not be made of a magnetic material and may be made of a material other than metal such as ceramics, resins, glass, rubber, or wood. The clamp elements 150 may be of a type which expands upon application of voltage or a type which contracts upon application of voltage. However, when the clamp elements 150 are of the type which contracts upon application of voltage, the position of the movable body 110 within the stationary body W can be maintained even when no electricity is supplied to the clamp elements 150.

Figure 13:
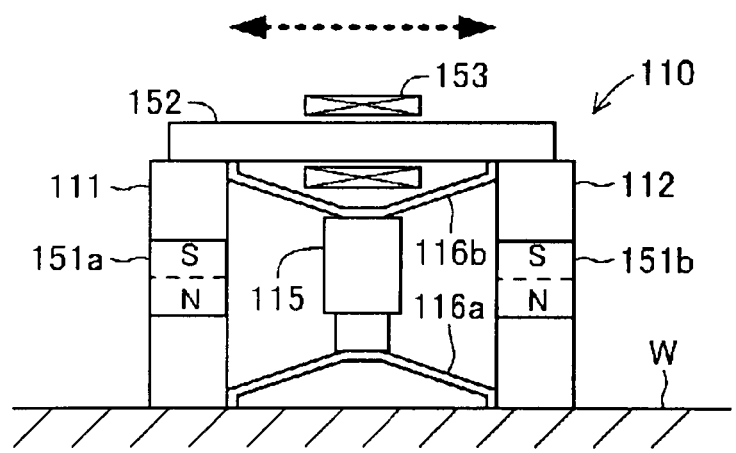
FIG. 13 is a front view schematically showing the overall structure of an inchworm actuator according to still another modified embodiment of the present invention.

In the inchworm actuator 100 shown in FIG. 13, the movable body 110 is mainly composed of first and second support legs 111 and 112, a voice coil motor 115, toggle mechanisms 116*a* and 116*b*, permanent magnets 151*a* and 151*b*, a magnetic conductor 152, and a magnetic field-forming coil 153. Of these components, the permanent magnets 151*a* and 151*b* generate magnetic fields of the same direction in the first and second support legs 111 and 112 and are provided in the first and second support legs 111 and 112. The magnetic conductor 152 is a magnetic member which magnetically connects the first and second support legs 111 and 112 and is slidably disposed on the first and second support legs 111 and 112. The magnetic conductor 152 may be any magnetic member which can magnetically connect the first and second support legs 111 and 112 and may be composed of a member which expands and contracts or bends (e.g., the toggle mechanisms 116*a* and 116*b*).

The magnetic field-forming coil 153 simultaneously generates magnetic fields of opposite directions in the first and second support legs 111 and 112 and is provided on the magnetic conductor 152. Operation of the magnetic field-forming coil 153 is controlled by the controller 130. The position and number of the magnetic field-forming coil 153 are not limited to those employed in the present embodiment so long as it can simultaneously generate magnetic fields of opposite directions in the first and second support legs 111 and 112.

The inchworm actuator 100 configured as described above is used such that the movable body 110 is disposed on a flat stationary body W made of a magnetic material. Specifically, in the inchworm actuator 100, when the controller 130 drives the magnetic field-forming coil 153 and the voice coil motor 115 (inchworm drive), the movable body 110 moves on the stationary body W (see the dashed line arrow in FIG. 13). When the movable body 110 moves, the magnetic attraction forces acting on the first and second support legs 111 and 112 change intermittently and alternately. Therefore, the magnetic conductor 152 moves together with the movable body 110 while sliding relative to the first support leg 111 or the second support leg 112. In the case where the movable body 110 is moved on the stationary body W, a guide in the shape of a protrusion or a groove for restricting the direction of displacement of the movable body 110 is preferably provided on the stationary body W.

Figure 14:
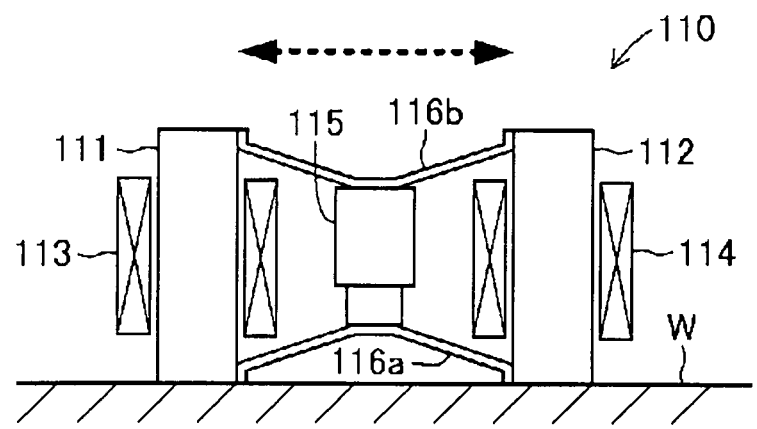
FIG. 14 is a front view schematically showing the overall structure of an inchworm actuator according to still another modified embodiment of the present invention.

In the inchworm actuator 100 shown in FIG. 14, the movable body 110 is mainly composed of first and second support legs 111 and 112, magnetic field-forming coils 113 and 114, a voice coil motor 115, and toggle mechanisms 116*a* and 116*b*. In this case, the first and second support legs 111 and 112 are made of a magnetic material. When electricity is supplied to the magnetic field-forming coils 113 and 114 under the control performed by the controller 130, the magnetic field-forming coils 113 and 114 magnetize the first and second support legs 111 and 112 such that the first and second support legs 111 and 112 temporarily function as magnets. At that time, the controller 130 supplies electricity to only one of the magnetic field-forming coils 113 and 114 so as to generate a magnetic field in only one of the first and second support legs 111 and 112 to thereby magnetize it.

The inchworm actuator 100 configured as described above is used with the movable body 110 disposed on a flat stationary body W made of a magnetic material. Specifically, in the inchworm actuator 100, when the controller 130 drives the magnetic field-forming coils 113 and 114 and the voice coil motor 115 (inchworm drive), the movable body 110 moves on the stationary body W (see the dashed line arrow in FIG. 14).

Figure 15:
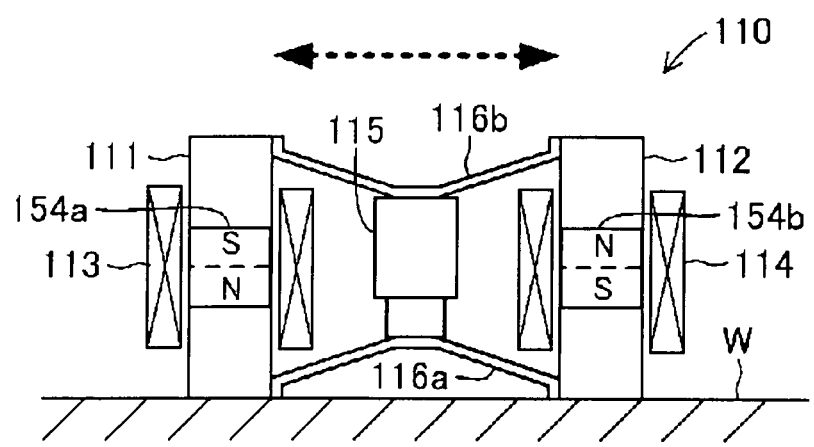
FIG. 15 is a front view schematically showing the overall structure of an inchworm actuator according to still another modified embodiment of the present invention.

In the inchworm actuator 100 shown in FIG. 15, the movable body 110 is mainly composed of first and second support legs 111 and 112, magnetic field-forming coils 113 and 114, a voice coil motor 115, toggle mechanisms 116*a* and 116*b*, and permanent magnets 154*a* and 154*b*. In this case, the first and second support legs 111 and 112 are made of a magnetic material. When electricity is supplied to the magnetic field-forming coils 113 and 114 under the control performed by the controller 130, the magnetic field-forming coils 113 and 114 magnetize the first and second support legs 111 and 112 such that the first and second support legs 111 and 112 temporarily function as magnets. At that time, the controller 130 controls the operation of the magnetic field-forming coils 113 and 114 so as to generate magnetic fields of the same direction in the first and second support legs 111 and 112 to thereby magnetize them. The permanent magnets 154a and 154b generate magnetic fields of opposite directions in the first and second support legs 111 and 112 and are provided on the first and second support legs 111 and 112.

The inchworm actuator 100 configured as described above is used with the movable body 110 disposed on a flat stationary body W made of a magnetic material. Specifically, in the inchworm actuator 100, when the controller 130 drives the magnetic field-forming coils 113 and 114 and the voice coil motor 115 (inchworm drive), the movable body 110 moves on the stationary body W (see the dashed line arrow in FIG. 13). In this case, when no electricity is supplied to the magnetic field-forming coils 113 and 114, the movable body 110 is magnetically attracted to and held on the stationary body W by the magnetic forces of the permanent magnets 154a and 154b. Therefore, the surface of the stationary body W on which the movable body 110 moves need not be a horizontal surface and may a sloping surface or a vertical surface.

Although a detailed description is not provided, the movable body 110 can be moved even when the permanent magnets 154a and 154b are disposed such that magnetic fields of the same direction are produced in the first and second support legs 111 and 112. In this case, the controller 130 controls the operations of the magnetic field-forming coils 113 and 114 so as to simultaneously generate magnetic fields of the opposite directions in the first and second support legs 111 and 112 to thereby magnetize them. With this operation, as in the case of the inchworm actuator 100 shown in FIG. 15, the movable body 110 can be moved on the stationary body W.

The above-described embodiment exemplifies the case where the inchworm actuator 100 is used as a positioning mechanism in equipment such as precision observation equipment, precision measurement equipment, various types of machining/assembly apparatuses, various types of robots, various types of business machines, and household appliances. However, the inchworm actuator according to the present invention can be widely used as a positioning mechanism, a transport mechanism, or a manipulator in an apparatus or equipment other than the above-described apparatus or equipment. For example, the inchworm actuator according to the present invention can be used as an actuator of a parallel link mechanism which positions various types of optical lenses or sample stages under an optical microscope or an atomic force microscope (AFM). Also, the inchworm actuator according to the present invention can be used for manipulating an object in various operations such as cell operations, microsurgery, sampling operations under a microscope, and assembly of precision components.

DESCRIPTION OF SYMBOLS

W: stationary body;
C1: first clearance;
C2: second clearance;
100: inchworm actuator;
101: first guide;
102: second guide;
103: upper frame;
104: lower frame;
105a, 105b: permanent magnet;
110: movable body;
111: first support leg;
112: second support leg;
113, 114: magnetic field-forming coil;
115: voice coil motor;
115a: yoke;
115b: permanent magnet;
115c: voice coil;
115d: support plate;
116a, 116b: toggle mechanism
120: drive power supply;
130: controller;
131: input device;
132: display device
140: 2-stage expansion/contraction device;
141: electromagnet;
141a: soft iron core;
141b: magnetic field-forming coil;
142: first movable piece;
143: second movable piece;
144a, 144b: spring;
150: clamp element;
151a, 151b: permanent magnet;
152: magnetic conductor;
153: magnetic field-forming coil;
154a, 154b: permanent magnet;
201, 202, 301, 302, 401, 402, 501, 502: magnetic field.

The invention claimed is:

1. An inchworm actuator comprising:
a stationary body;
a movable body which is movable with respect to the stationary body by inchworm drive and comprises first and second support legs, both the first and second supports being movable relative to the stationary body while being repeatedly clamped to the stationary body and unclamped therefrom, expansion/contraction means which displaces or deforms upon receipt of electric energy or magnetic energy, and a displacement conversion mechanism which receives as an input displacement the displacement or deformation of the expansion/contraction means, converts the input displacement to an output displacement by reduction conversion or expansion conversion in accordance with a conversion ratio, and moves the first and second support legs relative to each other by the output displacement, the conversion ratio changing depending on the amount of the input displacement;
clamp means for individually clamping the first and second support legs to the stationary body and individually unclamping the first and second support legs therefrom; and
inchworm control means for driving the expansion/contraction means and the clamp means so as to realize an inchworm action to move the movable body relative to the stationary body.

2. An inchworm actuator as claimed in claim 1, wherein the displacement conversion mechanism is a link mechanism.

3. An inchworm actuator as claimed in claim 2, wherein the displacement conversion mechanism is a toggle mechanism.

4. An inchworm actuator as claimed in 1, wherein the inchworm control means drives the expansion/contraction means and the clamp means so as to realize an inchworm action in a biased state in which the expansion/contraction means has been displaced or deformed by a prescribed amount.

5. An inchworm actuator as claimed in 1, wherein the expansion/contraction means comprises a voice coil motor.

6. An inchworm actuator as claimed in 1, wherein the expansion/contraction means comprises:
an electromagnet;
a first movable piece which is made of a magnetic material and is disposed to face a first pole of the electromagnet with a first clearance formed between the first movable piece and the first pole;
a second movable piece which is made of a magnetic material and is disposed to face a second pole of the electromagnet with a second clearance formed between the second movable piece and the second pole, the second clearance being greater than the first clearance; and
first and second elastic members which are disposed between the electromagnet and the first movable piece and between the electromagnet and the second movable piece respectively.

7. An inchworm actuator as claimed in 1, wherein at least one of the stationary body and a support leg portion including the first support leg and/or the second support leg is made of a magnetic material, and the other of the stationary body and the support leg portion includes a permanent magnet.

8. An inchworm actuator as claimed in claim 7, wherein:
the stationary body is made of a magnetic material;
the first and second support legs are made of a magnetic material and are magnetically connected together through a magnetic conductor made of a magnetic material;
the permanent magnet forms magnetic fields of the same direction in the first and second support legs;
the clamp means comprises a magnetic field-forming coil provided on at least one of the first support leg, the second support leg, and the magnetic conductor; and
the inchworm control means controls operation of the magnetic field-forming coil so as to simultaneously form magnetic fields of opposite directions in the first and second support legs.

9. An inchworm actuator as claimed in claim 7, wherein
the stationary body comprises first and second guides which are made of a magnetic material and extend in parallel to each other;
the first and second support legs are made of a magnetic material and are disposed between the first and second guides such that the first and second support legs are magnetically connected together;
the permanent magnet forms magnetic fields of the same direction in the first and second support legs;
the clamp means comprises a magnetic field-forming coil provided on at least one of the first support leg, the second support leg, the first guide, and the second guide; and
the inchworm control means controls operation of the magnetic field-forming coil so as to simultaneously form magnetic fields of opposite directions in the first and second support legs.

10. An inchworm actuator as claimed in claim 9, wherein the permanent magnet is disposed on the outer side of each of the first and second support legs between the first and second guides.

11. An inchworm actuator as claimed in claim 8, wherein the clamp means comprises a magnetic field-forming coil disposed on the first support leg and a magnetic field-forming coil disposed on the second support leg.

12. An inchworm actuator as claimed in claim 11, wherein the magnetic field-forming coil disposed on the first support leg and the magnetic field-forming coil disposed on the second support leg are connected in series such that they become opposite in phase.

13. An inchworm actuator comprising:
a stationary body;
a movable body which is movable with respect to the stationary body by inchworm drive and comprises first and second support legs, both the first and second support legs being movable relative to the stationary body while being repeatedly clamped to and unclamped from the stationary body, a drive actuator which displaces or deforms upon receipt of electric energy or magnetic energy, and a displacement conversion mechanism which is coupled to the drive actuator and receives as an input displacement the displacement or deformation of the drive actuator and converts the input displacement to an output displacement by reduction conversion or expansion conversion in accordance with a conversion ratio and moves the first and second support legs relative to each other by the output displacement, the conversion ratio changing depending on the magnitude of the input displacement;
a clamping mechanism which individually clamps the first and second support legs to the stationary body and individually unclamps the first and second support legs from the stationary body; and
an inchworm controller which controls the drive actuator and the clamping mechanism so as to produce an inchworm action by the first and second support legs and produce relative movement of the movable body with respect to the stationary body.

14. An inchworm actuator comprising:
a stationary body;
a movable body which is movable with respect to the stationary body by inchworm drive and comprises first and second support legs, both the first and second support legs being movable relative to the stationary body, a first mechanical linkage connected between the first and second support legs, and a linear actuator having a movable portion which is displaced by operation of the linear actuator, the movable portion of the linear actuator being operatively connected to the first linkage such that movement of the movable portion causes the first linkage to exert a force on the first and second support legs in a direction producing relative movement of the first and second support legs with respect to each other;
a clamping mechanism including a magnetic field-forming coil which forms a magnetic field to selectively clamp or unclamp the first and second support legs with respect to the stationary body by magnetic force; and
an electronic controller which controls the linear actuator and the clamping mechanism to produce an inchworm action by the first and second support legs.

15. An inchworm actuator as claimed in claim 14, wherein the linear actuator comprises a voice coil motor.

16. An inchworm actuator as claimed in claim 14, wherein the linear actuator comprises an electromagnet which is controlled by the controller, and a magnetic member which faces a pole of the electromagnet and is movable towards and away from the electromagnet in response to a magnetic force generated by the electromagnet, wherein one of the electromagnet and the magnetic member is connected to the first linkage.

17. An inchworm actuator as claimed in claim 14, wherein the clamping mechanism includes a permanent magnet which is disposed on one of the movable body and the stationary body and forms a magnetic circuit passing through at least one of the first and second support legs when the magnetic field-forming coil is energized.

18. An inchworm actuator as claimed in claim 14, wherein the first linkage comprises a leaf spring connected to the first and second support legs and coupled to the linear actuator between the first and second ends of the leaf spring.

19. An inchworm actuator as claimed in claim 14, further comprising a second mechanical linkage connected between the first and second support legs, wherein the first linkage comprises a first leaf spring connected to the first and second support legs, the second linkage comprises a second leaf spring connected to the first and second support legs, and the linear actuator is disposed between and connected to the first and second leaf springs.

* * * * *